US006754584B2

(12) United States Patent
Pinto et al.

(10) Patent No.: US 6,754,584 B2
(45) Date of Patent: Jun. 22, 2004

(54) ATTITUDE MEASUREMENT USING A SINGLE GPS RECEIVER WITH TWO CLOSELY-SPACED ANTENNAS

(75) Inventors: Robert Pinto, Lincoln, MA (US); James Kain, Shalimar, FL (US)

(73) Assignee: Enpoint, LLC, Lincoln, MA (US)

( * ) Notice: Subject to any disclaimer, the term of this patent is extended or adjusted under 35 U.S.C. 154(b) by 183 days.

(21) Appl. No.: 09/977,071

(22) Filed: Oct. 12, 2001

(65) Prior Publication Data

US 2002/0165669 A1 Nov. 7, 2002

Related U.S. Application Data

(60) Provisional application No. 60/272,170, filed on Feb. 28, 2001.

(51) Int. Cl.[7] ............................................. G06F 165/00
(52) U.S. Cl. ...................... 701/215; 701/200; 701/207; 701/38; 342/357.06
(58) Field of Search ................................. 701/200, 207, 701/213, 214, 215, 216, 38; 342/357.06, 357

(56) References Cited

U.S. PATENT DOCUMENTS

| 5,347,286 A | 9/1994 | Babitch ...................... 342/359 |
| 5,446,465 A | 8/1995 | Diefes et al. ................ 342/357 |
| 5,534,875 A | 7/1996 | Diefes et al. ................ 342/357 |

(List continued on next page.)

FOREIGN PATENT DOCUMENTS

| JP | 08262123 | 10/1996 | ............. G01S/5/15 |
| WO | WO 98/12572 | 3/1998 | ............. G01S/5/06 |
| WO | WO 00/22452 | 4/2000 | ............. G01S/5/02 |

OTHER PUBLICATIONS

Buchler, R.J., et al., "Design and Test of a Synergistic Interferometric GPS–INS" Position Location and Navigation Symposium, 1996, IEEE 1996,p. 612–619.
Ellis, J.F., et al., "Interferometric Attitude Determination with the Global Positioning System," J.Guidance and Control, vol. 2, No. 6, 1979, p. 522–527.
Lloret, Polen, "Inertial and Total Station and GPS for High Productivity Surveying," IEEE Plans '90, Las Vegas, NV 1990 p. 338–346.

(List continued on next page.)

Primary Examiner—Thomas G. Black
Assistant Examiner—Arthur D. Donnelly
(74) Attorney, Agent, or Firm—Hamilton, Brook, Smith & Reynolds, P.C.

(57) ABSTRACT

A system determines three-dimensional attitude of a moving platform using signals from two closely spaced Global Positioning System (GPS) antennas. The system includes three rate gyroscopes and three accelerometers rigidly mounted in a fixed relationship to the platform to aid in determining the attitude. The system applies signals from a first of the two GPS antennas to sufficient channels of a GPS receiver to support navigation. The system applies signals from a second of the two GPS antennas to the remaining receive channels, which are configured to support interferometry. The system optimally selects the navigation and interferometry channels to provide an interferometric heading solution. The system resolves the ambiguity normally associated with the interferometric heading solution by having the closely spaced GPS antennas and using interferometry to refine a coarse heading estimate from a GPS plus Inertial Measurement Unit (IMU) transfer alignment solution. The system achieves close sub-meter spacing of the two GPS antennas by merging many temporal interferometric measurements that result from an attitude memory provided by the IMU time-history solution.

44 Claims, 10 Drawing Sheets

U.S. PATENT DOCUMENTS

| | | |
|---|---|---|
| 5,548,293 A | 8/1996 | Cohen .................. 342/357 |
| 5,575,316 A | 11/1996 | Pollklas |
| 5,617,317 A | 4/1997 | Ignagni |
| 5,672,872 A | 9/1997 | Wu et al. |
| 5,809,457 A | 9/1998 | Yee et al. |
| 5,899,945 A | 5/1999 | Baylocq et al. ............ 701/4 |
| 5,917,448 A | 6/1999 | Mickelson ............. 342/442 |
| 5,929,805 A | 7/1999 | Tadros et al. ........... 342/357 |
| 6,005,514 A | 12/1999 | Lightsey ................ 342/365 |
| 6,088,653 A | 7/2000 | Sheikh et al. .......... 701/214 |
| 6,101,430 A | 8/2000 | Fuller et al. ............ 701/13 |
| 6,114,988 A | 9/2000 | Schipper et al. ....... 342/357 |

OTHER PUBLICATIONS

Sohne, W., et al., "Integrated INS/GPS System for High–Precision Navigation Applications," Position Location and Navigation Symposium, 1994, IEEE Las Vegas, NV, 1995, p. 310–313.

Roger C. Hayward, Demoz Gebre–Egziabher, Matt Schwall, J. David Powell and John Wilson, "Inertially Aided GPS Based Attitude Heading Reference System (AHRS) for General Aviation Aircraft" Presented at ION GPS' 97, Kansas City, MO,Sep. 1997.

ATTITUDE MEASUREMENT USING A SINGLE GPS RECEIVER WITH TWO CLOSELY-SPACED ANTENNAS

RELATED APPLICATION(S)

This application claims the benefit of U.S. Provisional Application No. 60/272,170, filed on Feb. 28, 2001; the entire teachings of which are incorporated herein by reference.

GOVERNMENT SUPPORT

The invention was supported, in whole or in part, by contracts DAAB07-00-C-J603 and DAAB07-01-C-J403 from US Army Communications Electronics Command. The Government has certain rights in the invention.

BACKGROUND OF THE INVENTION

The present invention relates to moving platforms, specifically, to a system for determining the geodetic attitude of an arbitrarily moving platform. Moving platforms include vehicles, such as aircraft, ground vehicles, boats or spacecraft or equipment mounted to vehicles that can be reoriented relative to the vehicle body. The platforms may be traveling at fast or slow speeds, may be maneuvering or non-maneuvering, and may be occasionally stationary relative to geodetic space. These platforms require knowledge of their geodetic attitude in order, for example, (i) to support safety or stability control systems, (ii) to point an antenna or sensor boresight at a geodetically known target, (iii) to control their geodetic position or attitude movement, or (iv) to register the information sensed along the boresight onto a map projection with geodetic coordinates. The sensor or antenna boresight is the centerline of some signal collection or signal transmission aperture.

Earth-rate sensing through gyrocompassing, GPS interferometry, and transfer alignment (TA) are possible implementation approaches for precision geodetic orientation measurement systems for arbitrary moving platforms. Each technique is in widespread use, but each technique alone has significant limitations for precision pointing.

Earth rate sensing requires the use of a gyroscope with accuracy much better than the earth's 15-deg/hr-rotation rate. The gyroscopes used for conventional gyrocompass systems have drift specifications of less than 0.1 deg/hr. Modern military gyroscopes, currently used on missiles, can achieve a 1 deg/hr accuracy with prices of about $5000 in large quantities. For a 1-deg/hr tactical weapon grade gyroscope, the north seeking accuracy is about 4 deg and is not sufficiently accurate for broadband pointing.

GPS interferometry measures GPS carrier phase to GPS satellites from multiple spaced antennas. Carrier phase differencing removes all common mode ionospheric corruption from the differenced signals. The remaining phase difference can be used to infer range to GPS satellites to millimeter (mm) accuracy. The measurement is corrupted by cable-induced phase differences, on-vehicle multipath, and a whole-cycle GPS wavelength ambiguity that is 19 cm for commercial GPS. A method not based on interferometry is often used to get close to the correct attitude and reduce whole-cycle ambiguity. Commercial motion characterization systems that use GPS interferometry are available, but impose installation difficulties by requiring multiple antennas dispersed over several square meters. Also, the lack of wide-bandwidth attitude memory prevents any accuracy enhancement through data averaging unless the system is perfectly stationary.

Transfer alignment is the most widely used precision orientation measurement method for military applications. Transfer alignment synergistically combines an Inertial Navigation System (INS) with single-antenna GPS system to estimate position and attitude. The INS, traditionally used only in military applications and high-end aircraft, has an internal instrument suite that provides measurement of three axes of acceleration and three axes of rotation rate. Mathematical manipulation of the acceleration and rotation rate measurements provides the position, velocity, and attitude of the platform at a high bandwidth. However, the navigation solution will drift unless some external corrections are incorporated. For low cost inertial components, the drift will occur rapidly. GPS external measurement is most often used for the INS corrections. For GPS transfer alignment, INS-derived velocity and GPS-derived velocity are differenced, and the time-history of the differences is then used to infer errors in assumed geodetic alignment of the INS axes. The need to maintain persistent changing velocity to enable attitude measurement and the traditional high cost of the INS make TA unsuitable for most commercial applications. TA uses a mathematics model where attitude errors propagate into the IMU-derived platform position and velocity in geodetic coordinates. By independently measuring the geodetic position and velocity with the navigation GPS solution, the attitude errors are observed and corrected. However, the attitude errors are observable through the velocity, such that a change in attitude produces a change in geodetic velocity. The presence of a specific force acting on the platform must be present to impart attitude observability. A specific force is almost always present in the vertical direction since a force must be imposed to maintain the platform from falling towards the center of the earth. Thus, attitude orthogonal to the vertical direction, the platform roll and pitch angles, are readily observed for any platform not in a free-fall condition. However, a platform at a constant velocity in the horizontal plane will have no observability of attitude about the vertical direction, the platform yaw angle. For successful transfer alignment, the horizontal plane motion must be sensed by the GPS carrier phase measurements from the navigation GPS antenna. Because integrated carrier phase measurements are accurate to millimeter (mm) levels, even for a very low cost commercial receiver, only a slight platform motion is sufficient for some level of heading attitude measurement. Most moving platforms will have some motion from external disturbances for attitude estimation to an accuracy of several degrees.

In addition to the techniques just described, the prior art also includes patents teaching techniques to determine geodetic attitude from moving vehicles. For example, U.S. Pat. No. 5,575,316 to Buchler describes a generalized motion characterization system employing multiple GPS antennas and receivers and an IMU device. Key to Buchler's preferred embodiment of this device, and clearly stated throughout his sample embodiment and claims, is a requirement to overcome a large uncertainty in the initial platform heading. This initial heading error, coupled with a 1 m GPS antenna spacing, causes the GPS interferometric range-to-satellite ambiguities to produce ambiguous platform heading measurements. The large initial heading error of 10 deg stated by Buchler results from the use of gyrocompassing to ascertain initial platform heading independent of GPS interferometry. Gyrocompassing, as is understood in the art, relates to sensing the rotation rate of the 15-deg/hour-earth vector. The LN-200 IMU rate gyro employed in the Buchler invention has a gyro drift of 1 deg/hr that produces the 10 deg heading error following a gyrocompass event. The majority of the Buchler invention relates to the refinement of the initial attitude uncertainty to a level where no ambiguities are present in the final measurement.

The Buchler invention poses at least six considerations that prevent low manufacturing cost, ease of installation, and operation with arbitrary platforms:

Two independent GPS receivers are required to determine double difference relationships used for the interferometric processing. This means that two oscillators are used in the GPS RF front-end downconversion process. The use of two oscillators causes added measurement noise when carrier phase from the two channels are differenced. Also, the use of two independent GPS receivers increases the cost.

The use of a 1 deg/hr IMU, necessary for gyrocompassing attitude initialization, demands a relatively high-cost IMU unsuitable for most commercial applications.

The use of a gyrocompass stage to initiate the attitude measurement process is not suitable for arbitrary platform operations. Gyrocompassing restricts the platform motion and requires a significant period of initialization time.

The Buchler invention assumes the use of a barometric altimeter for independent altitude measurement. Such a measurement is problematic for all platforms because of the need to maintain a clean and precisely oriented passage to ambient airflow.

The Buchler invention assumes that all GPS satellites visible on one antenna are also visible to the second antenna to arrive at the double differences used by a Kalman filter. This suggests a requirement for use of either two standard GPS receivers, each tracking the same GPS satellites, or specialized, more costly, receiver architecture with twice the standard number of channels.

A problem is posed by the Buchler invention that relates to achievable accuracy of the attitude solution. The bulk of the embodiment relates to the use of a double-difference phase function, which Buchler claims to treat as a scalar measurement to the Kalman filter. Double differences result in M-1 scalar measurements for M GPS satellites being tracked. However, the measurements are correlated because common GPS satellite ranges are used in multiple measurements. Treating such correlated measurements as uncorrelated scalar measurements by the Kalman filter leads to a suboptimal filter, as is well known in the art. The embodiment mentions the use of a single-difference measurement formulation but does not describe how this mechanization will produce uncorrelated scalar measurements for the Kalman filter.

In another patent example, U.S. Pat. No. 5,617,317 to Ignagai describes a generalized motion characterization system employing multiple GPS antennas and receivers and an IMU device. The Ignagai invention assumes the existence of a separate Inertial Sensor System on the platform, distinct from the dual-antenna GPS system. Ignagai does not fully integrate the IMU rotation rate and acceleration measurements into the attitude measurement processing; instead, the Ignagai invention takes independently derived attitude information from the Inertial Sensor System and combines it with differential range information determined from a two-antenna interferometric GPS system. Ignagai uses a simple three-state Kalman filter to smooth the angular misalignment between the two independently derived heading angles. As in the Buchler invention, two independent GPS antenna/receivers are used coupled to a differential range processor. The Inertial Sensor System is said to be an Attitude and Heading Reference System (AHRS), which is known with the art to be a self-contained navigation system employing a separate air-data system, as explained by Ignagai.

Ignagai describes three types of interferometric measurement processing: differential range, differential carrier phase, and differential integrated Doppler counts. Ignagai discusses antenna separations of 10–20 m for the differential range measurement, 1–2 m for the integrated Doppler count method, and "a possibility" of 3.75 inches separation for the differential carrier phase measurement. However, the embodiment develops only the formulations for the differential range and the integrated Doppler count methods. Ignagai makes little mention of the interferometric heading ambiguity problem treated extensively by Buchler.

Ignagai discusses the heading initialization as using the aircraft cockpit magnetic compass for a stationary aircraft, or by using the aircraft track heading while the aircraft is taxiing on the ground. The aircraft track heading initialization process assumes that the IMU and antenna baseline are aligned with the taxi velocity so that the heading alignment is equal to the ground velocity vector as measured from GPS. Ignagai notes that this is problematic for an in-air initialization of the heading because the aircraft body attitude is not aligned with the velocity vector.

Seven considerations are posed by Ignagai that prevent achieving low manufacturing cost, ease of installation, and ease of operation with arbitrary platforms:

Two independent GPS receivers are required to determine the interferometric relationships used for the interferometric processing. This means that two oscillators are used in the GPS RF front-end downconversion process that contributes to the phase measurement noise. Also, two GPS receivers increase the cost.

Ignagai assumes a separate and distinct Inertial Sensor System, such as an AHRS, that will be too costly for general commercial applications.

The use of an aircraft track heading procedure for initializing the heading measurement process is not generally suitable for platforms where the IMU and GPS baseline are arbitrarily oriented with respect to the platform velocity vector.

Ignagai assumes the use of an Air Data Sensor. Such a measurement sensor is problematic for all platforms because of the need to maintain a clean and precisely oriented passage to the ambient airflow.

Ignagai assumes that all GPS satellites visible to one antenna are also visible to the second antenna to arrive at the interferometric differences used by the Kalman filter. This suggests the requirement for either using two standard GPS receivers that each tracks the same GPS satellites or using a tailored receiver architecture with twice the standard number of channels.

Ignagai uses a simple three-state Kalman filter for smoothing the inertial sensor and GPS interferometric angle errors. Such a simplistic filter form cannot exactly represent the precision attitude memory achievable when a more complete IMU and GPS integration is mechanized. This prevents the optimal merging of past interferometric measurements and restricts the achievable measurement accuracy.

Ignagai integrates the Inertial Sensor System and interferometric range system through a filter applied to a Euler angle. This approach results in a mathematical problem as the system crosses the earth poles. A coordinate system switch is required as the platform reaches higher latitudes. This is undesirable and reduces the generality of the invention for general platform geodetic motion.

Two more patent examples include U.S. Pat. No. 5,672,872 to Yeong-Wei and U.S. Pat. No. 5,809,457 to Yee. Both Yeong-Wei and Yee describe a generalized motion characterization system employing a GPS antenna and receiver integrated to an IMU device via a Kalman filter. Both Yeong-Wei and Yee inventions use a single GPS antenna rather than the dual antennas of the Buchler and Ignagai inventions. Yeong-Wei specifically describes the well-known problem of such single-GPS-antenna mechanizations: persistent maneuvers are required to enable the heading attitude to be observable. Purposeful aircraft maneuvers are described as necessary for the example aircraft embodiment. Yee is specialized to an application where the GPS antenna and IMU are located to the boresight of a sensor or antenna system. However, Yee makes no reference to the problem of heading errors when persistent horizontal plane maneuvers are not present. Yee makes no mention of intentional maneuvers for achieving the heading alignment. Neither Yeong-Wei nor Yee mentions the use of dual GPS antennas for the purpose of avoiding the heading drift when horizontal plane motion is not present.

SUMMARY OF THE INVENTION

Numerous commercial applications demand the pointing of a sensor boresight towards a location known in geodetic coordinates. Some emerging applications include pointing a highly directional antenna at an orbiting broadband satellite or pointing a sensor at a pre-determined ground location from an aircraft or ground vehicle and controlling the throttle, braking, and suspension systems to insure safety and stabilization of automobiles. Many other applications exist that require the attitude of a platform structure to permit maneuvering in geodetic space, such as the control of an aircraft in flight. Finally, many applications exist where the boresight of a sensor is required to be known, but not controlled, for the purpose of geo-registering the information received by the sensor. This is the case, for example, during the collection of image sequences that are to be used for reconstruction of objects observed within the images or for mosaicking a sequence of images onto a common map coordinate system.

The prior art provides approaches to the commercial requirements; however, each of the prior art approaches must be tailored to the specific platforms, requires costly hardware components and/or installation techniques, imposes maneuver restrictions on the platforms, and does not take full advantage of the available GPS and IMU measurements.

The present invention provides a complete six-degree of freedom geodetic characterization of an arbitrary dynamic or stationary platform. The geodetic characterization includes position, velocity, acceleration, attitude and attitude rates. The present invention poses no restriction on the motion of the platform and requires no electrical connectivity to the platform except for power. Furthermore, systems employing the principles of the present invention can be both manufactured and installed at costs significantly less than systems defined in the prior art.

One embodiment of the present invention includes two navigation GPS antennas, three rate gyroscopes, three accelerometers, and at least one processor to calculate the geodetic characterization of the platform. The processor(s) determine an integrated navigation solution through signals received by the navigation GPS antennas and through signals derived by the gyroscopes and accelerometers.

In the process of determining a navigation solution, the navigation GPS antennas, preferably electrically similar, feed received RF signals to two RF downconverters. Both RF downconverters utilize the same thermally controlled oscillator so that any oscillator-induced noise is common-mode between the two RF front-end channels. Signals output by the downconverters go into a single, commercially available, 12-channel, correlator chip that tracks pseudorandom noise signals from up to twelve GPS satellites and outputs channel tracking information, which is an input to the processor(s).

The processor(s) use the channel tracking information to determine the time-of-transit for each GPS signal from its respective GPS satellite. Each time-of-transit has a common-mode bias due to the processor clock error. The processor(s) control the GPS satellite signal tracking process for each channel and decode the digital messages also contained in the GPS satellite signals. If four GPS satellites are tracked, then the processor(s) determine the common mode clock bias and the geodetic position of the platform using methods well known in the art.

The processor(s) also accept data from the six IMU sensors: the three rate gyroscopes mounted along orthogonal axes and the three accelerometers mounted collinearly with the gyroscope axes. The rotation rate and acceleration data provided by the gyroscopes and accelerometers, respectively, are used by the processor(s) to form a strapdown navigation solution using methods that are well known in the art. The strapdown navigation solution results in a position, velocity, and attitude geodetic navigation solution. The processor(s) use a well-known transfer alignment procedure to determine the complete three-dimensional attitude of the platform by comparing the strapdown navigation solution with the navigation solution derived solely from the navigation GPS antennas, as described above. The processor(s) are able to provide the geodetic characterization of the platform using rate gyroscopes providing poorer than ten degrees/hour accuracy under arbitrary motion conditions. The principles of the present invention include at least five innovations:

Utilization of available spare capacity within commercially available low cost GPS receivers enables GPS interferometry using only a single GPS receiver. This provides both cost advantages and accuracy improvement because the same oscillator is used for downconversion of both GPS antenna signals.

Close spacing of two GPS antennas, down to about 3 inches, depending on accuracy requirements of the application. This enables simplified packaging, with less space involvement, and installation to the mobile platforms. Close antenna spacing also minimizes the effects of multipath interference on the attitude solution.

Tight integration of the single-GPS-antenna transfer alignment process with the dual-antenna GPS interferometry process. This yields heading estimation independent of the GPS interferometry solution so that heading ambiguities normally resulting from interferometric solutions alone are immediately resolved. This obviates the requirements for heading initialization procedures such as gyrocompassing, alignment-to-velocity, or use of a magnetic compass from moving platforms. For a stationary platform, integration with the IMU enables a simple method for resolving the heading ambiguities normally plaguing GPS-only attitude measurement methods.

Use of single-difference GPS carrier phase measurements. This ensures that uncorrelated scalar measurements are provided to a Kalman filter as is required for optimal estimation. This enables improved measurement accuracy over scalar double-difference measurements that are fundamentally correlated.

Acceleration aiding of the GPS receiver channels from the IMU information. This allows tightening the channel track loop bandwidths by predicting platform velocity providing added multipath resistance over close antenna spacing and the narrow correlator technologies well known in the art.

Figure 1:
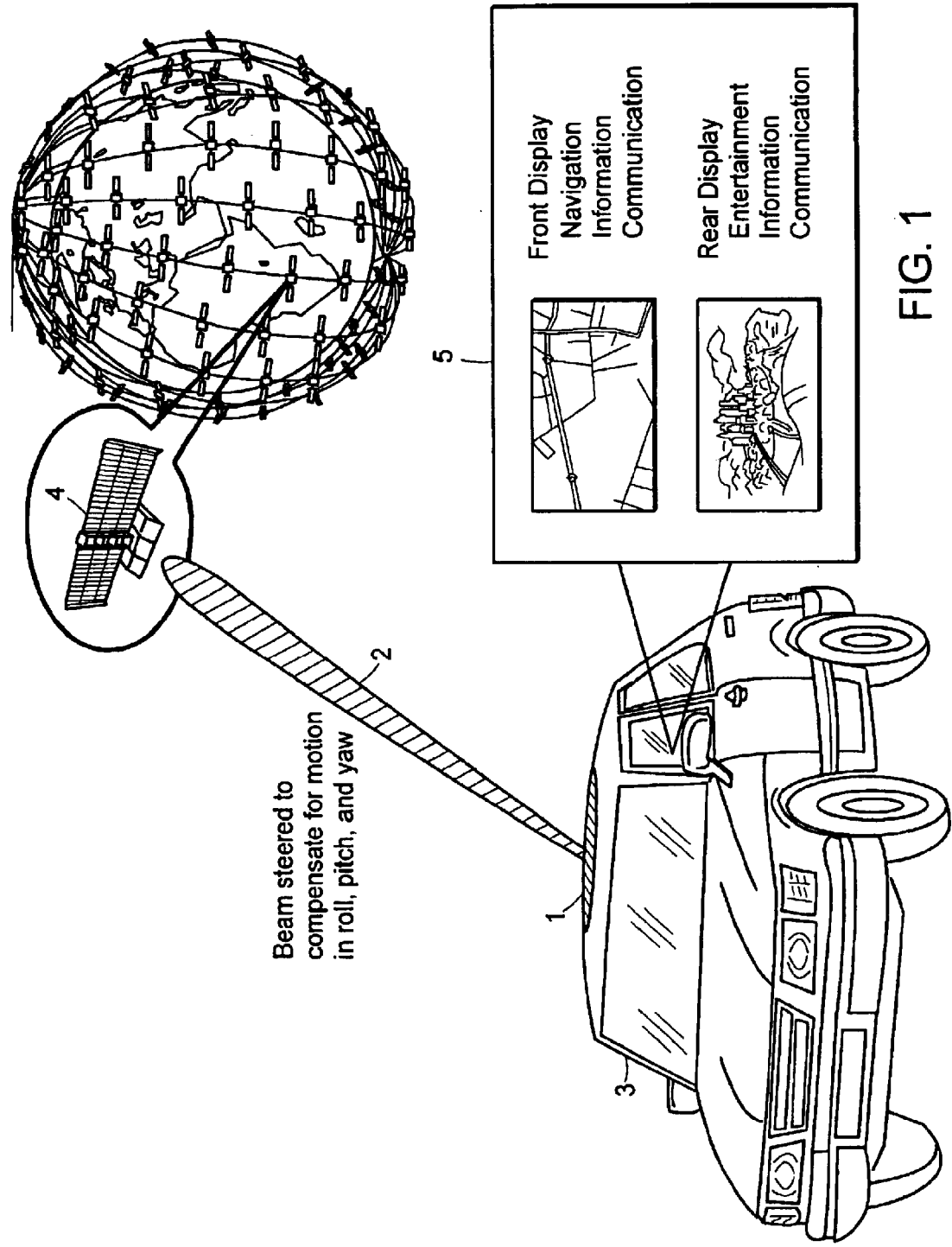
FIG. 1 is a pictorial diagram of an example broadband communication scenario that is enabled by an motion characterization system that is developed according to the principles of the present invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

The current explosive growth in mobile vehicle display products is accompanied by increased demand for robust access to high-quality spatial information and to broadband data sources, such as streaming video, digital television, and high definition television (HDTV). The present invention can be used to facilitate delivery of multimedia broadband data to users in vehicles, such as cars, planes, trains, boats, and airplanes. New generations of satellite-based broadband delivery systems use Low Earth Orbit (LEO) satellites operating at 20 GHz or higher frequencies and require precise pointing of highly directional antennas to achieve high data rates.

The present invention permits use of poor performance, low-cost motion sensing devices both to enable accurate, affordable, antenna pointing solutions for broadband mobile communications and to permit the robust delivery of spatial information to both military and commercial platforms. These new delivery systems place stringent requirements on the user equipment for antenna pointing accuracy, operation in adverse multipath environments, satellite tracking performance, and communication effectiveness to achieve continuous operation. User equipment for fixed terminals can use traditional mechanical antenna approaches. User equipment for mobile vehicles, however, demands more innovative solutions to meet requirements for unobtrusive surface mounting, high pointing accuracy from a high-dynamics moving platform, and low satellite-to-satellite switching times.

FIG. 1 is a pictorial diagram of an example application that may employ the present invention. The example application is a mobile communications system that provides, for example, video content to a moving vehicle 3. The vehicle 3 is equipped with an antenna 1 that is capable of steering a beam 2 at a broadband, content-delivery satellite 4 providing the video content. The antenna 1 has an integrated geodetic motion characterization system (shown in FIG. 2), employing the principles of the present invention, that uses navigation carrier signals from the Global Positioning System (GPS) satellites and motion signals from motion sensing devices (shown in FIG. 2) to calculate roll, pitch, and yaw angles of the vehicle 3. The antenna 1 uses these angles, or beam angle control signals calculated therefrom, to keep the beam 2 pointing at the content-delivery satellite 4. Keeping the beam 2 pointing at the content-delivery satellite 4 results in good signal quality of the video signal displayed in a display 5 viewed by passengers in the vehicle 3.

The present invention also provides characterizations of vehicle motion that can be applied to improved vehicle safety systems, enhancements in occupant convenience, evolutionary development of telematics and communications systems, and delivery of data to improved vehicle displays. Further, the present invention provides an innovative, low-cost measurement solution that allows consolidation of discrete elements and the synergistic combination of hardware and software systems.

Table 1 is a chart detailing vehicle systems for safety and broadband access, with the associated components and sensors listed in the decision support and principal sensors columns, respectively. The comments column includes a list of example applications and uses.

TABLE 1

| Vehicle System | Decision Support | Principal Sensors | Comments |
| --- | --- | --- | --- |
| Safety | Brake modulation, steering system, suspension, and engine control | Integrated gyroscopes, accelerometers, and GPS | Unintended change in direction or orientation; excessive roll Road condition monitoring Telematics support Vibration signature |
|  | Stabilized camera and radar |  | Road lane surveillance Collision avoidance and pre-crash recognition |
| Broadband Access | Antenna pointing | Integrated gyroscopes, accelerometers, and GPS | Satellite-based and tower-based communications for high data rate information |

Figure 2:
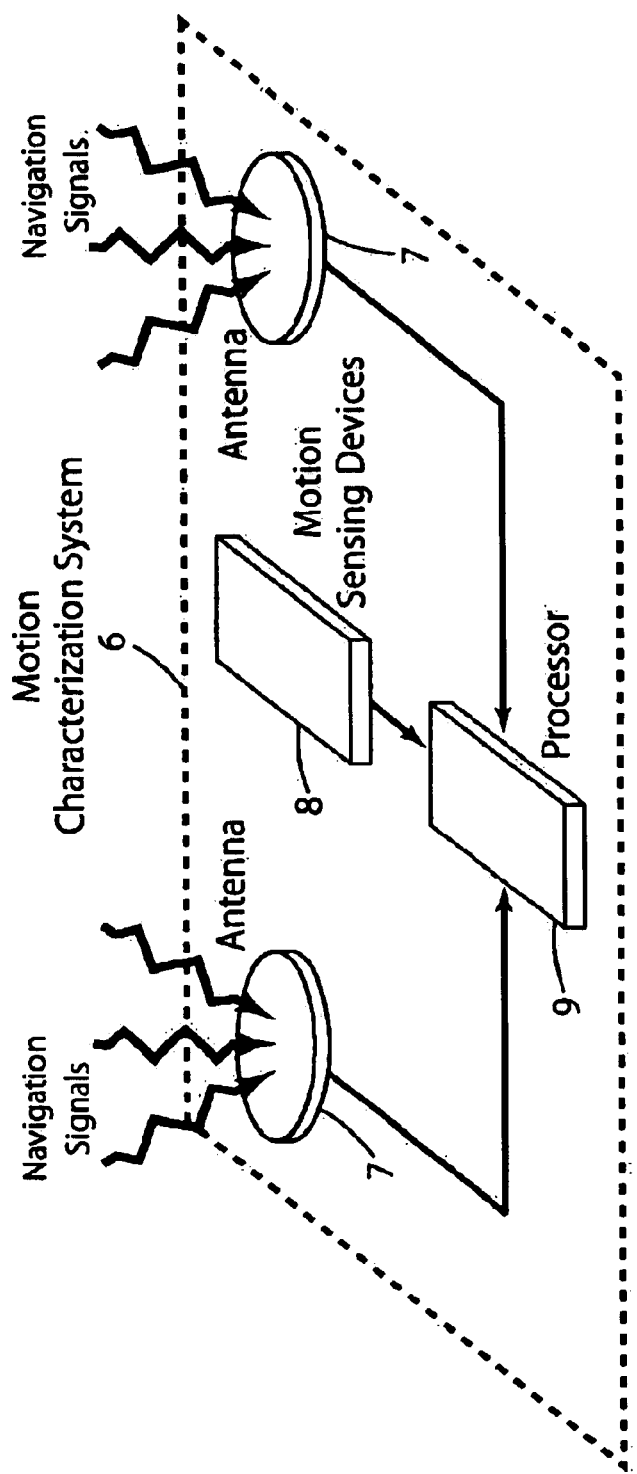
FIG. 2 is a high-level block diagram of the measurement and processing components of the motion characterization system of FIG. 1.

FIG. 2 is a schematic diagram of an embodiment of the motion characterization system 6 employing the principles of the present invention that can be integrated into the antenna 1 of FIG. 1 or applications listed in Table 1. The motion characterization system 6 includes two antennas 7, motion sensing devices 8, and at least one processor 9. The antennas 7 and motion sensing devices 8 are rigidly connected, directly or indirectly, to the body or platform, such as a vehicle rooftop, whose angular attitude is being sensed.

The motion characterization system 6 uses the two antennas 7 to receive navigation signals, the motion sensing devices 8 to provide information about body motion, and the processor 9 to estimate the motion of the body for delivery to other system applications. The navigation signals may be transmitted by GPS, GLONASS, Galileo, the Global Navigation Satellite System (GNSS), or other navigation systems as available. The motion sensing devices 8 may include gyroscopes, accelerometers, magnetometers, tilt meters, speed measurement devices, navigation receivers, or other sensors. The processor 9 may be a general-purpose computer, digital signal processor (DSP), application specific integrated circuit (ASIC), or other computing device. The preferred embodiment uses minimal number of motions sensing devices to achieve performance objectives, but can be extended to include additional motion sensing devices and other sensors to improve effectiveness or extend the number of simultaneously supported applications.

The processor 9 uses the GPS signals and motion measurements to achieve sufficient motion estimation accuracy for the pointing, safety, telematics, and control applications. Navigation systems, such as GPS, provide precision positioning at all earth locations, at commodity pricing that is typically less than $50 for commercial applications. GPS however, does not provide attitude information. Therefore, the motion characterization system 6 determines both the orientation and change of orientation of the receiving platform by other techniques. The motion characterization system 6 measures attitude, as parameterized by roll, pitch, and yaw, under all motion conditions, including the difficult situation of no motion.

When the platform is nominally horizontal, to within +/−30 deg, and the platform is stationary or moving at walking-to-driving speeds, neither magnetic compass nor accelerometer-alone tilt sensors are sufficient for the approximately 0.5 deg geodetic attitude measurement accuracy required for broadband mobile communication. Magnetic compass solutions are sensitive to local magnetic disturbances, and accelerometer-only solutions are sensitive to platform lateral accelerations.

Although Earth-rate sensing through gyrocompassing, GPS interferometry, and transfer alignment (TA) are possible implementation approaches, the limitations associated with these approaches makes them unsuitable for an application such as content delivery to mobile communications systems. For example, the problems associated with TA stem from the inability to sense yaw attitude directly. TA requires changes in vehicle velocity to enable estimation of yaw from velocity matching and requires precision gyroscopes because of the algorithmic need for heavy smoothing of the platform motion. The present invention overcomes this dilemma by sensing the yaw attitude from a completely different source—dual antenna interferometry. Thus, the motion characterization system 6 combines TA with dual antenna interferometry to achieve the approximate 0.5 degree geodetic attitude measurement accuracy required for the broadband mobile communication system and other applications.

Figure 3:
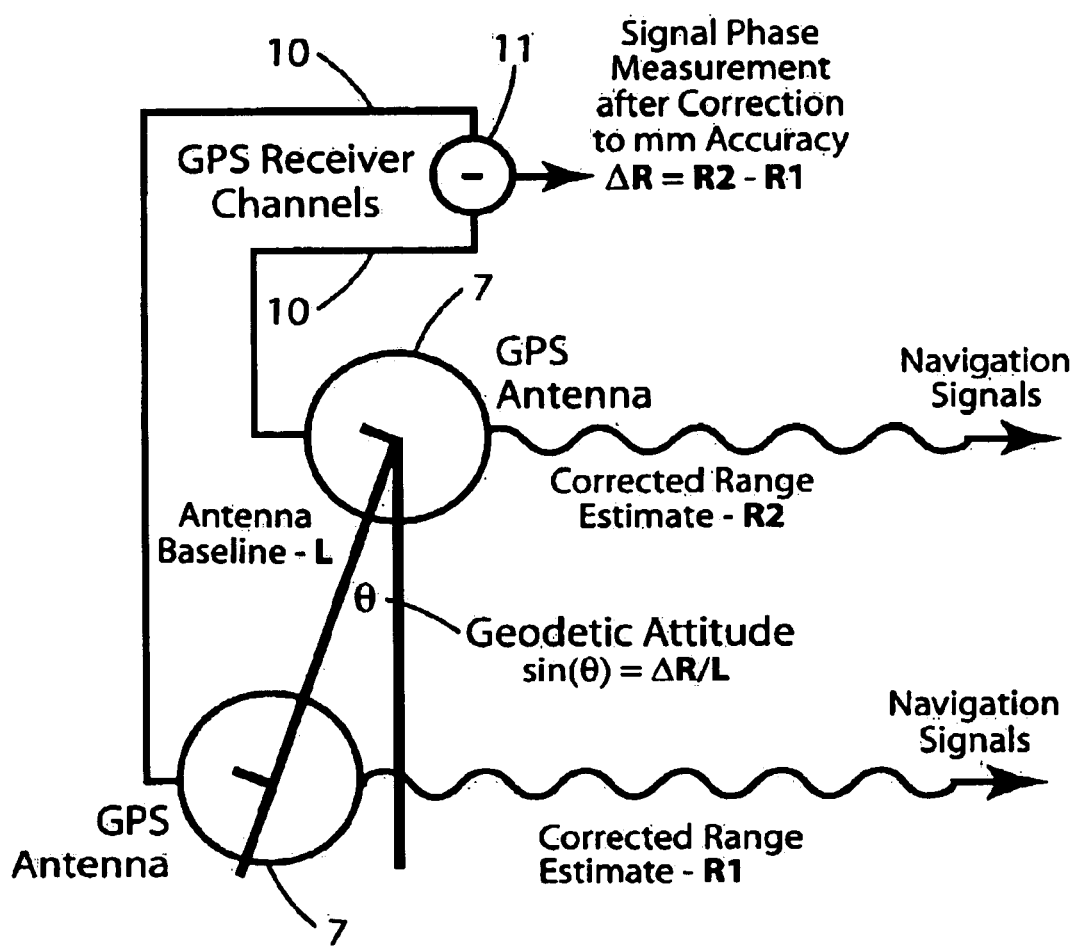
FIG. 3 is an electromechanical schematic diagram showing the central concept underlying GPS interferometry used by the motion characterization system of FIG. 1.

FIG. 3 is a high level schematic diagram of dual antenna interferometry as used by the motion characterization system 6, and consists of GPS antennas 7, associated receiver channels 10, and a range difference calculation unit 11 encapsulating inertial measurement, signal processing, and estimation functions. The difference calculation unit 11 provides signal phase measurements that are accurate to millimeter precision after GPS interferometry. The geodetic attitude is calculated as sin $(\theta) = \Delta R/L$, where $\Delta R$ is the difference in GPS signal phase and L is the antenna baseline length.

Figure 4:
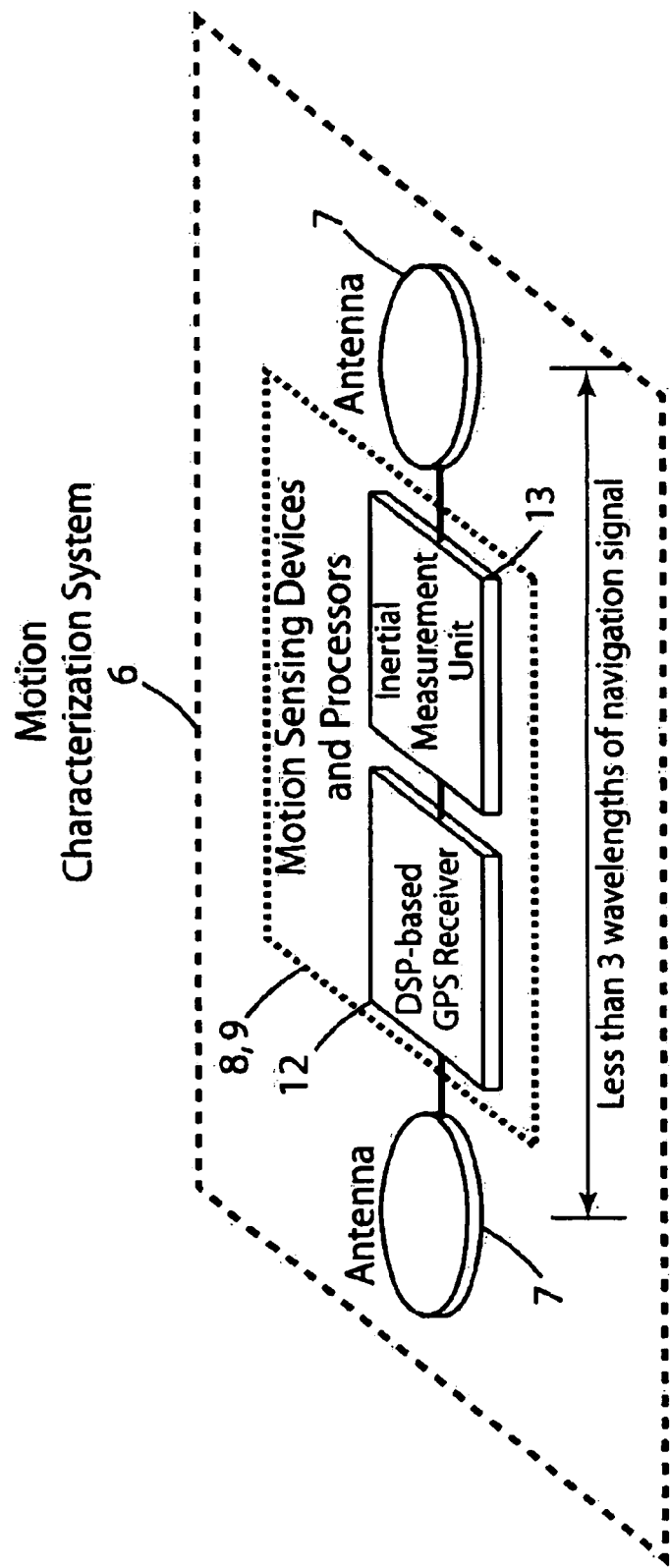
FIG. 4 is a block diagram of an example implementation of the motion characterization system of FIG. 2 having an Inertial Measurement Unit (IMU) and a GPS receiver with an integrated Digital Signal Processor (DSP)

FIG. 4 is an embodiment of the motion characterization system 6 including the two antennas 7 and one or more substrates containing the motion sensing devices 8, processor(s) 9, and other interface components. In one embodiment, the processor(s) 9 include a DSP-based GPS receiver 12 with excess capacity to support the GPS, navigation, interferometry, and control calculations. Additional processors may be required for some complicated control applications and may be programmed to operate in a parallel manner. In one embodiment, the motion sensing devices 9 include an Inertial Measurement Unit (IMU) 13 to provide the motion measurements of the platform or body.

The motion characterization system 6 provides acceptable performance for high data rate broadband applications while permitting use of poor quality Micro Electromechanical System (MEMS) devices in the IMU 13 and a commodity-priced DSP-based GPS receiver 12 for the processor 8. Better quality devices will lead to more accurate attitude measurement; however, with only poor quality MEMS devices (e.g., rate gyroscopes having poorer than 10 degrees/ hr accuracy), the motion characterization system 6 achieves the less than 1-degree attitude measurement accuracy required for high data rate, broadband communications with LEO satellites at Ka band.

The motion characterization system 6 requires only two antennas because TA provides precision estimates of roll and pitch. In addition, a heading solution provided by the motion characterization system 6 is relatively insensitive to GPS antenna spacing because of the smoothing benefits of even low-accuracy inertial components. While considerable effort has gone into optimizing techniques for GPS interferometry and TA, no commercially available systems rely on the integration of the two. The result is the motion characterization system 6 having an elegant implementation of a simple electronics architecture that can be populated with a handful of breakthrough technology chips and/or components.

When the platform is stationary, the processing accurately measures the roll and pitch attitude relative to the local vertical from the measurements provided by the motion sensing devices. The processor 9 uses the differential carrier phase measurement from GPS interferometry to determine yaw; however, the yaw estimate from a single GPS satellite is ambiguous due to the 0.19 m GPS wavelength. When the navigation and interferometry GPS antennas track multiple GPS satellites, an algorithm resolves the interferometric ambiguity in yaw.

The GPS receiver 12 may be a modem GPS receiver that uses twelve correlator channels to search the complete range-Doppler space for GPS navigation signals, reducing the time-to-first-fix (TTFF) and enabling rapid initialization of the position solution on startup or following loss of GPS satellite lock. However, the number of visible GPS satellites is very rarely over nine, and frequently only five to seven; thus, the GPS receiver 12 nearly always has access to spare correlator channels after initialization. In addition, performance improves only marginally when over six GPS satellites contribute to the solution. Thus, once several GPS satellites are acquired, four to five of the correlator channels are unused, and the motion characterization system 6 uses the spare channels for interferometry. The traditional interferometric solutions have multiple parallel receivers that each track the same GPS satellites. For example, the common implementation of a conventional GPS receiver has twenty-four correlator channels so that six GPS satellites from those in view can be tracked on each of four antennas.

GPS receivers are often mechanized with a single radio frequency (RF) front end and a 12-channel correlator. The RF front end converts the input GPS RF signal from an associated antenna to a digital intermediate frequency (IF) signal that is then fed into each of the identical twelve channels of the correlator chip for tracking up to twelve GPS satellites.

Figure 5:
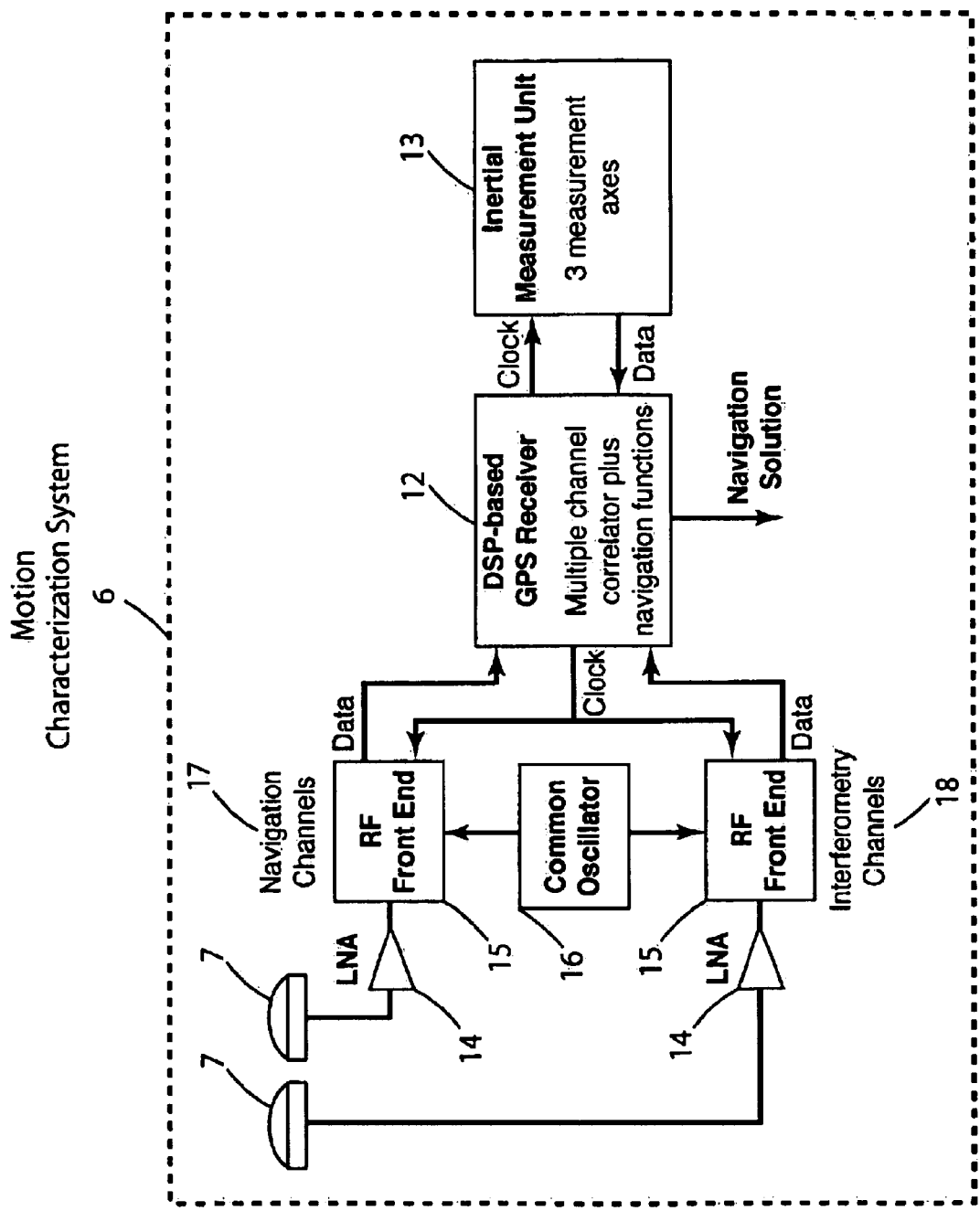
FIG. 5 is a schematic diagram depicting a preferred embodiment of the motion characterization system in FIG. 4 and showing the segmentation of navigation signals to support processing into navigation channels and interferometry channels.

FIG. 5 is a preferred embodiment of the motion characterization system 6 using navigation signal antennas 7, two low noise amplifiers (LNAs) 14 to establish correct signal levels, and two RF front ends 21, which are driven by a common oscillator 16 to reduce system noise figure.

The motion characterization system 6 uses one of the two GPS antennas 7 as a navigation GPS antenna, feeding RF signals to a set of navigation channels 17, which permits the receiver 15 to use a GPS satellite acquisition process that is identical to the conventional GPS receiver. Typically, the correlator channels in the DSP-based GPS receiver 15 use a fast acquisition process on as many available channels as necessary to process signals from all GPS satellites in view.

The motion characterization system 6 produces a complete geodetic position and velocity solution. When combined with the data from the IMU 13, this solution also gives excellent roll and pitch attitude, and good heading information when the platform is persistently maneuvering in the horizontal plane. Without such persistent maneuvers or when the platform is stationary, poor heading measurements result with only using navigation channels.

Following initialization, the motion characterization system 6 uses the second of the GPS antennas 7 as an interferometry antenna, which feeds RF signals to the remaining GPS receiver channels, referred to as interferometry channels 18. Through interferometric range measurement, the GPS satellites provide information on the vehicle heading relative to north for augmenting the heading information provided by the IMU 13 and navigation antenna alone. The IMU 13 and navigation antenna provide sufficient information to allow excellent roll and pitch attitude information.

The preferred embodiment uses a single GPS receiver to achieve reduced GPS phase measurement errors because the common oscillator 16 is used for both antenna paths. Also, platform heading is known to an accuracy of 1-2 deg, independent of the two-antenna interferometric process, through the single-antenna-plus-IMU solution with an optional magnetic compass. The accurate heading combined with close GPS antenna spacing enables a unique interferometric solution for the heading as refined through the interferometric process.

GPS interferometry that uses three or four antennas can achieve three-dimensional attitude measurement without inertial aiding, but requires antenna spacing on the order of 1 meter to achieve sufficient accuracy. A single GPS antenna and receiver when combined with an Inertial Measurement Unit (IMU) that includes three rate gyroscopes and three accelerometers can also achieve three-dimensional attitude measurement. However, this device requires lateral maneuvers of the platform so that velocity matching between the GPS and inertial sensor-derived velocity solutions can occur. The present invention, however, uses two closely spaced GPS antennas combined with an IMU to provide high accuracy for both stationary and moving vehicles.

Because the motion characterization system 6 uses two antennas 6 that can be spaced as closely as three inches apart, typical installation costs on the platforms are reduced. Also, though many embodiments are possible, a single embodiment of the invention is suitable for all candidate air, space, ground, and sea platforms with minimum modification. The antennas used on a platform are preferably compact and very closely spaced so that only a single compact, flush-mount component is mounted to the upper surface of the platform. Also, in one embodiment, no external equipment is required to be on the platform for generating the measurement other than a power source.

Alternative embodiments may use a different oscillator for each RF front end, a DSP-based GPS receiver for navigation functions and a separate DSP-based GPS receiver for interferometry functions, a GPS receiver and a separate DSP for processing functions, and other architectural combinations. The preferred embodiment is simple, and leads to a low cost, high performance solution. The DSP-based GPS receiver 12 also provides navigation and interferometry functions in addition to typical GPS correlator and information delivery functions.

Figure 6:
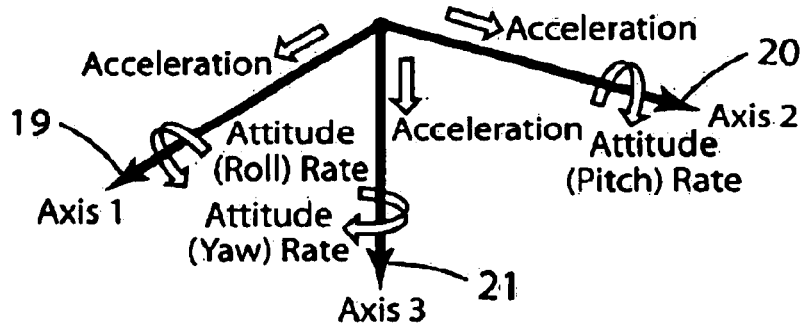
FIG. 6 is a vector diagram showing the measurement of three axes of acceleration and three axes of attitude rate by the IMU in FIG. 5 after the calibration of the IMU to align the axes.

The IMU 13 of FIG. 5 develops estimates of acceleration and attitude rates along three axes. As shown in FIG. 6, the IMU 13 develops estimates along a first axis 19, a second axis 20, and a third axis 21. In practice, acceleration and attitude rates are measured along different, non-orthogonal triads of axes that are subsequently orthogonalized and aligned using a calibration procedure. Subsequent processing uses the parameters of the error model that result from initial calibration. The error model includes bias, scale factor, noise properties, and various angular errors among the instrument axes, including: three non-orthogonalities for the accelerometer triad, three non-orthogonalities for the gyroscope triad, three misalignments between the accelerometer and gyroscope triads, and three misalignments to a body frame. The calibration software, optionally executed by a processor (not shown) in the IMU 13 or other processor 9 in the motion characterization system 6, includes a Kalman filter with the error terms as free parameters that are determined using Maximum Likelihood Parameter Estimation (MLPE) optimization or other suitable optimization technique. After calibration, the IMU 13 in FIG. 5 provides calibrated acceleration and attitude rate data along three measurement axes.

Figure 7:
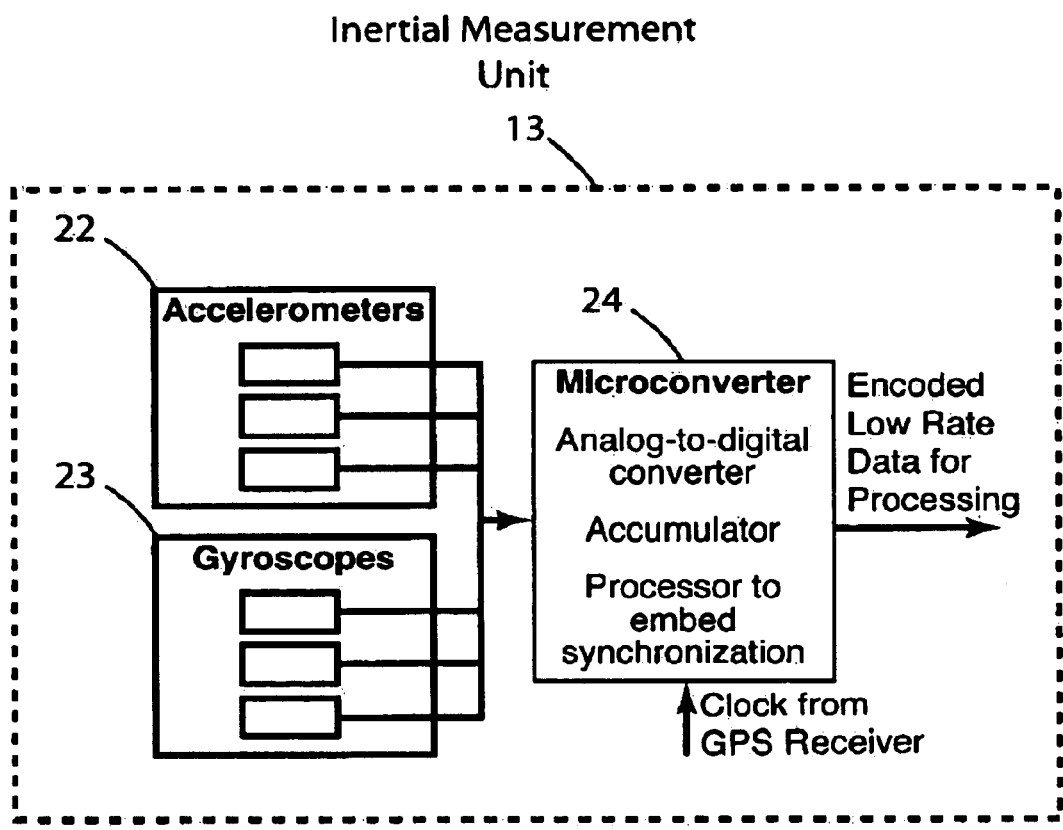
FIG. 7 is a schematic diagram of the IMU of FIG. 5 and shows the integration of three accelerometers, three gyroscopes, and a microconverter for analog-to-digital conversion and processing.

FIG. 7 is a block diagram of an embodiment of the IMU 13. In one embodiment, the IMU 13 uses three MEMS accelerometers 22 and three MEMS gyroscopes 23 for a low-cost solution. A microconverter 24 digitizes data from the accelerometers 29 and the gyroscopes 30, accumulates sets of digitized data, and embeds synchronization data indicating a GPS epoch provided by the GPS receiver 12. The tight coupling of the interferometry solution with the MEMS-based IMU improves the overall performance of the motion characterization system 6.

Figure 8:
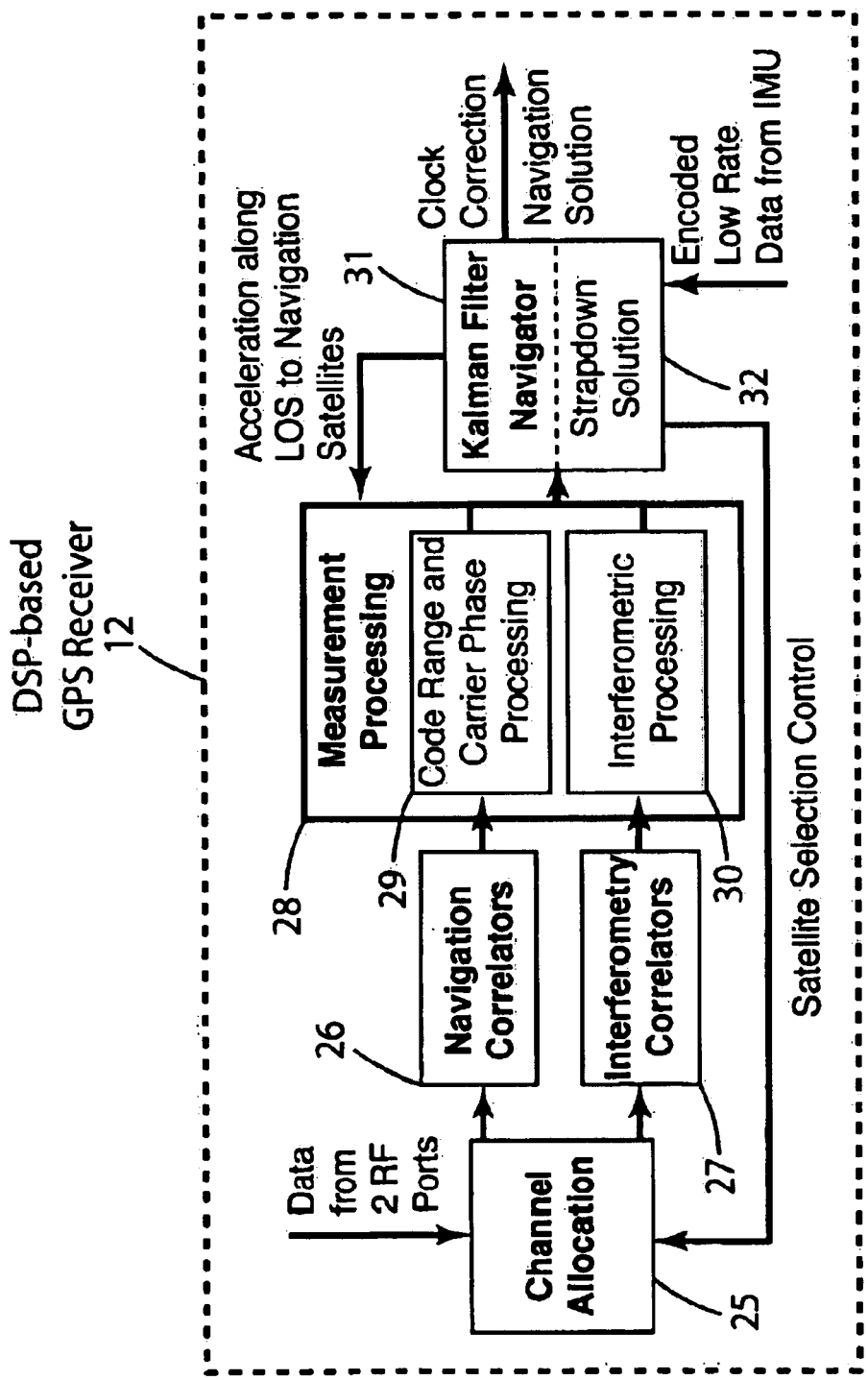
FIG. 8 is a flow diagram for the DSP-based GPS receiver of FIG. 5 and shows the selection and allocation of navigation signal channels, the use of navigation and interferometry correlators, the aided measurement of system parameters, and the use of a Kalman Filter navigator to provide a navigation solution, clock corrections, aiding information, and channel allocation information.

FIG. 8 is a functional diagram of processes executed in the DSP-based GPS receiver 12 in FIG. 5. A channel allocator 25 orchestrates the flow of data from the two RF front ends 15 (FIG. 5). Once inside the DSP, the data is allocated to navigation correlators 26 and interferometry correlators 27 that are logically formed from a set of correlators available within the GPS receiver 12. The process executing in the GPS receiver 12 configures the navigation channels to track the smallest number of GPS satellites that provide an acceptable navigation solution and configures the interferometry channels to track the GPS satellites most nearly orthogonal to the antenna baseline and preferably low on the horizon.

As shown in FIG. 8, the measurement processing 28 includes code range and carrier phase processing 29 to support navigation functions. The measurement processing 28 also includes interferometric processing 30 to support interferometry calculations. The measurement processing 28 provides measurement models, linearized measurement models, error models, and measurement and error propagation information used by subsequent processing.

A Kalman filter navigator 31 provides the estimation processing used to merge the IMU and GPS measurements. Kalman filtering, which is well known in the art, requires a statistical mathematics model of the underlying system dynamics and the measurement processes. The accuracy of the Kalman filter results is dependent both on the accuracy of the underlying models and on the adherence of the models to the constraints imposed by the Kalman filter formulation.

The measurement processing 28 and the Kalman filter navigator 31 use fundamental observables to infer system behavior. The GPS receiver 12 thus uses IMU measurements, selected GPS signal observables, and a spe cifically formulated Kalman filter state model to estimate attitude.

All GPS receiver 12 uses pseudorandom noise (PRN) code sequences to synchronize the correlator channels for each tracked GPS satellite. This correlation process provides a measure of the transit time of the signals from each GPS satellite to the user. This transit time computation is relatively accurate for all GPS satellites being tracked but contains an uncertainty due to the receiver oscillator forming the basis of the clock. Use of four GPS satellites allows solution of the three-dimensional location of the user and the user clock error. The low rate digital message contains information about the calibration of the GPS satellite clocks, precise orbital data for each acquired GPS satellite, and the almanac containing less precise orbital data for all GPS satellites.

The mechanization of the GPS position solution is of little utility to the determination of attitude. Instead, the motion characterization system 6 uses two basic GPS observables for attitude measurement, which depend on the coherence of the transmitted GPS signal waveform. The two basic GPS observables are:

Integrated Carrier Phase (ICP)—Because the GPS waveform is coherent, the GPS receiver can lock to the phase of the GPS satellite waveform and integrate phase changes to arrive at a precise measure of the change in received carrier phase over measured time intervals. Because the GPS satellite orbit is precisely known, the motion characterization system 6 can predict the contribution to phase change resulting from Doppler. The residual phase change is a measure of the average velocity of the GPS receiver during the measurement interval, a GPS epoch.

Dual-antenna carrier phase difference—For two closely spaced antennas, the carrier phase can be measured and used to infer information about the range difference between the two antennas and the GPS satellite. The range difference is ambiguous by the signal wavelength.

The ICP for a single receiver and single GPS satellite contains errors due to the stability of the ionosphere and uncertainty in the GPS satellite orbit. However, by differencing the per-epoch ICP between two closely spaced antennas, then the resulting double differenced carrier phase measurement is free of errors from the GPS satellite orbit or ionosphere. This measurement has mm-level accuracy with even low cost GPS receivers.

While multiple-antenna interferometry can provide information about the attitude of the GPS baseline from single-epoch multiple-satellite observations, the velocity information from GPS requires a more inferential approach. The attitude error from an IMU solution propagates into a velocity error in proportion to the vector cross product with the vehicle acceleration. Thus, an estimate of the attitude results by comparing the GPS precision velocity measurement with the IMU-derived velocity. The motion characterization system 6 uses both attitude inference phenomena simultaneously to provide an optimal estimate of the attitude.

The Integrated Carrier Phase observable to the jth GPS satellite at the i+1 th epoch can be described mathematically as $$ICP_j(t_{i+1}) = R_j(t_{i+1}) - R_j(t_i) + \delta f \quad (1)$$

where $\delta f$ is the error in the receiver oscillator over the epoch. The range is given by $$R_j(t_{i+1}) = \sqrt{\left(r_{s_j}(t_{i+1}) - r_u(t_{i+1})\right) \cdot \left(r_{s_j}(t_{i+1}) - r_u(t_{i+1})\right)} \quad (2)$$

where $r_{s_j}$ is the position vector to the jth GPS satellite and $r_u$ is the position vector to the receiver in a common coordinate frame. Also, $$R_j(t_{i+1}) = \sqrt{\left(r_{s_j}(t_i) - r_u(t_i) + \delta r\right) \cdot \left(r_{s_j}(t_i) - r_u(t_i) + \delta r\right)} \quad (3)$$

where $$\delta r = r\dot{Y}_{s_j}\Delta T + \int_{t_i}^{t_{i+1}} r\dot{Y}_u dt \quad (4)$$

Linearizing with respect to $\delta r$ yields $$R_j(t_{i+1}) = R_j(t_i) + \frac{(r_{s_j} - r_u)}{R_j(t_i)} \cdot \delta r \quad (5)$$

or $$R_j(t_{i+1}) = R_j(t_i) + u_j \cdot \delta r, \quad u_j = \frac{(r_{s_j} - r_u)}{R_j(t_i)} \quad (6)$$

where $u_j$ is the unit vector to the jth GPS satellite. Substituting yields $$ICP_j(t_{i+1}) = u_j \cdot \delta r + \delta f \quad (7)$$

Equation (7) is the measurement equation relating the observable ICP to the IMU 13 and GPS clock errors over an epoch. The term $\delta r$ from equation (4) pertains to the integral of the velocity and not the instantaneous velocity, which is important because the IMU error equation propagates the continuous velocity error between epochs.

Most IMU/GPS integration solutions assume the availability of a continuous GPS velocity measure, which is derived from a frequency-lock-loop within the hardware and sampling the resulting locked frequency. Because of the large GPS satellite-induced Doppler offset, an accurate measurement of high instantaneous velocity requires an extremely precise measurement of the continuous instantaneous velocity. High-end GPS achieves velocity estimation accuracy of 0.03-m/sec. The motion characterization system 6 uses the integrated velocity rather than the instantaneous velocity to allow an order of magnitude accuracy improvement in performance at an order of magnitude reduction in cost.

The prior art has not used this strategy for mechanization reasons, which the Kalman filter navigator 31 of the present invention overcomes. A Kalman filter state is added for each GPS satellite according to $$\delta rY_j = u_j \cdot \delta v \quad (8)$$

which ignores, temporarily, the coordinate frame of the measurements. A measurement must also be added for each GPS satellite-specific state according to $$\Delta \delta r_m = \delta r(t_{i+1}) - \delta r(t_i). \quad (9)$$

Thus, the measurement equation (9) is a function of the difference between the current state and a past state. Such a Kalman filter form is highly non-standard and results in cumbersome matrix forms. The Kalman filter navigator 31 supports this special case.

The dual-antenna carrier phase difference observable is the dot product of the antenna baseline $(r_2^b - r_1^b)$ with the LOS to the jth GPS satellite $(\hat{u}_j)$. Using the assumption of the GPS satellite located at infinity leads to the following expression for the differential carrier phase $(\delta \rho)$:

$$\hat{u}_j^n \cdot C_b^n (r_2^b - r_1^b) = \delta \rho + \rho \quad (10)$$

The unknown phase state error p accounts for phase from the two independent receivers. Upon filter startup, $\rho$ is an arbitrary value because of the receiver phase differences.

Equation (10) is linearized with respect to IMU-axes-to-n-frame (geodetic) misalignments, as well as for misalignments of IMU axes with respect to the antenna baseline. By considering small geodetic angle errors $(\Delta \theta)$ and antenna alignment errors $(\Delta \phi^b)$ in $C_b^n$, the following expression results:

$$\delta \rho_j - \hat{u}_j^n \cdot \tilde{C}_b^n (r_2^b - r_1^b) = \quad (11)$$
$$\hat{u}_j^n \cdot \{\Delta \theta \times \tilde{C}_b^n (r_2^b - r_1^b)\} + \hat{u}_j^n \cdot \{\tilde{C}_b^n \Delta \phi^b \times (r_2^b - r_1^b)\} + \rho$$

where $\tilde{C}_b^n$ represents the misaligned direction cosine matrix from the strapdown navigation computational process 32.

Equation (11) is the measurement equation for the Kalman filter. The left side of Equation (11) defines the measured-minus-predicted phase difference. The right side of Equation (11) represents the errors in this estimate expressed in terms of (i) IMU and antenna baseline alignment errors and (ii) receiver-to-receiver phase errors. The antenna alignment enters the equation in a similar manner as the IMU alignment except that the antenna alignment is assumed constant in a body axis frame. The antenna baseline alignment error states are typically initialized with standard deviations of several degrees, which is reduced during processing as the geodetic angular errors are reduced through the traditional transfer alignment process. Only two of the small angular errors for the three angles in the vector $\Delta \phi^b$ are used since rotation about the antenna baseline is not observable. However, the formulation keeps the three elements in the solution to allow an arbitrary antenna baseline axes orientation relative to the IMU axes 26, 27, 28.

Effective system integration requires use of the IMU-to-GPS baseline misalignment as a component of the Kalman filter. The addition of the second GPS antenna forms a geometric baseline. The alignment accuracy of the baseline relative to the IMU is directly correlated to the geodetic attitude estimation accuracy. The motion characterization system 6 estimates the alignment during processing to avoid costly and non-robust installation measurements.

The motion characterization system 6 may optionally use a novel SigmaEta strategy for implementing a Kalman filter from an arbitrary state vector and measurement model. The motion characterization system 6 may also use a tailored SigmaEta Kalman filter for the dual-antenna operation, although other embodiments may use alternative forms for the Kalman filter. The definition of the state vector elements depends on the following construct:

$$\dot{g}b = \eta_{gb} - gb/\tau_{gb} \quad (12)$$

Equation (12) represents a first-order Markov process with white noise input $\eta$ and correlation time $\tau$. The subscripts associate the input and output noise and correlation with the specific state variable. The representation of the statistical parameters allows the system error to vary in time in a statistically well-behaved manner. The clock model is a set of Brownian motion sequences, with the noise strengths derived from evaluation of actual GPS receiver data.

Table 2 shows the elements of a state vector used in the Kalman filter navigator 31, where states 29-38 represent the interferometry phase. The error state standard deviations of these errors are initialized at about 0.05 wavelengths. The ICP states are used to model the integral of the integral of velocity along the LOS to each GPS satellite. The platform navigation state can be highly dynamic.

TABLE 2

| Name | State number | Dynamical Representation |
|---|---|---|
| Velocity error | 1–3 | $\delta \dot{v}^n = \delta \theta \times C_b{}^n \underline{a}^b + C_b{}^n \underline{ab} + C_b{}^n [\underline{asfe}] \underline{a}^b$ |
| Attitude error | 4–6 | $\delta \dot{\theta}^Y = C_b{}^n [(\underline{gb} + [\underline{gsfe}] \omega_{b/i}{}^b) \times]$ |
| Position error | 7–9 | $\underline{\dot{\delta r}}^t = C_n{}^t \underline{v}^n$ |
| Accelerometer bias | 10–12 | $\underline{\alpha \dot{Y} b} = \eta_{ab} - \underline{ab}/\tau_{ab}$ |
| Gyroscope bias | 13–15 | $\underline{\dot{gb}} = \eta_{gb} - \underline{gb}/\tau_{gb}$ |
| Accelerometer scale factor error | 16–18 | $\underline{\dot{asfe}} = \eta_{asfe} - \underline{asfe}/\tau_{asfe}$ |
| Gyroscope scale factor error | 19–21 | $\underline{\dot{gsfe}} = \eta_{gsfe} - \underline{gsfe}/\tau_{gsfe}$ |
| IMU-GPS latency | 22 | $\dot{T}_1 = \eta_T - T_1/\tau_T$ |
| GPS clock | 23–25 | $\dot{\beta} = \eta_\beta; \dot{f} = \beta + \eta_f; \dot{c} = f + \eta_c$ |
| Baseline alignment | 26–28 | $\dot{\phi} = 0$ |
| Interferometry phase | 29–38 | $\dot{\Omega} = \eta_\Omega - \Omega/\tau_\Omega$ |
| ICP states | 39–48 | $\Delta \dot{r}_j = C_n{}^t \underline{u}_j{}^n \cdot \underline{v}^n$ |

The Kalman filter navigator 31 avoids the situation where measurements are combinations of current and past state values by doing a reset on the ICP states at each epoch. The state values are set to zero, and the standard deviations are set to very near zero. The Kalman filter navigator 31 also sets the state correlation coefficients to zero along the rows and columns associated with the reset state. This process results in a very simple implementation with the expense of adding auxiliary states and managing the reset process.

The measurement formulation for the dual-antenna Kalman filter includes three sets of measurements corresponding to the coarse position estimates, the code tracking process, the ICP measurements, and the dual-antenna measurements.

With two GPS receivers each tracking all GPS satellites in view, the Kalman filter used by the Kalman filter navigator 31 allows up to 30 measurements per epoch, which correspond to ten measurements for each measurement set. Each measurement is processed individually using the Kalman filter update formulation.

The Kalman filter allows recursive processing of the measurement data, which allows the sequential processing of measurements. However, for the processing to provide accurate results according to the practiced art, each measurement must be uncorrelated with the prior sequential measurement. For interferometry, processing typically differences integrated carrier phase measurements, first between antennas and then between GPS satellites to obtain a double difference measurement.

Carrier phase differencing between closely spaced antennas for a common GPS satellite removes common-mode errors associated with the ionosphere path length and GPS satellite transmission. However, a common-mode receiver clock error remains following the differencing. Often, in the practiced art, the processing performs a second difference between signals from two GPS satellites to remove the common time bias in the common mode clock error. The sequential measurements now become correlated if they include noise associated with a common GPS satellite. For example, if $z_A = M_B - M_A$ and $z_B = M_C - M_A$ represent measurement differences between satellite B and satellite A and satellite C and satellite A, respectively, then the measurements $z_A$ and $z_B$ are correlated because each measurement difference contains the same noise from $M_A$. Consequently, the correlations in the resulting double differenced measurements cannot be processed directly by a straightforward Kalman filter formulation. The single-differenced measurements do not contain correlations; however, the Kalman filter state vector dynamic modeling procedure must model the common-mode clock errors. The Kalman filter navigator 31 uses the single-difference carrier phase measurement model with CPU clock error model, and the double differenced carrier phase measurement may be used in alternative embodiments.

Multipath interference in a GPS receiver results from receiving the combination of the direct path and reflected path from a single GPS satellite. The extraneous reflections occur from fixed structures in the surroundings, such as buildings and towers, from terrain features within the surrounding environment, or from the portion of the platform structure. In an urban environment in the proximity of tall buildings, multipath will result in pseudorange errors of 5–10 meters for affected GPS satellites. In such situations, phase multipath can produce interferometric solutions that are significantly in error. The motion characterization system 6 uses strategies for multipath mitigation that include detecting and discarding GPS satellites with evidence of multipath, using closely spaced antennas, and having a carrier tracking loop that uses platform acceleration aiding. The strategies for multipath mitigation include:

Deep signal fades can occur with the phased addition of all signal returns, resulting in loss of lock. Anomalous tracking conditions can occur before the loss of lock and during re-acquisition. Because of the ability to selectively depend on the IMU navigation solution, the motion characterization system 6 can operate with fewer, possibly zero, GPS satellites for an extended period. Additionally, the motion characterization system 6 is capable of quickly discarding navigation data from GPS satellites that are providing motion estimates not consistent with measured accelerations or other GPS satellite measurements.

GPS antenna design, the design of antenna ground planes, and care in placing the GPS antenna on a platform offer some multipath protection; however, multipath signals are often present in any complex urban scene or vehicle mounting surface. For path lengths that differ considerably, as in the case for reflections from nearby buildings, GPS signal tracking methods involving narrow correlator bandpass methods can provide multipath protection on each receiver channel. However, because interferometry relies on mm-level position differences, multipath reflections with even small path length differences appear differently at the two GPS antennas and can pose serious problems. As the two antennas are brought closer together in the presence of a complex multipath environment, both antennas are more likely to see the same reflected energy pattern. Therefore, the close spacing of the navigation antennas 7 used by the motion characterization system 6 mitigates multipath.

The individual channels of the correlator chips 26 and 27 provide both pseudorandom noise (PRN) code tracking and carrier tracking for each GPS satellite. Typically, the expected dynamics of the vehicle along the line-of-sight (LOS) to the GPS satellite is the single most significant aspect of the tracking loop designs. By aiding the tracking loops with acceleration along the LOS, the motion characterization system 6 can anticipate the platform dynamics, thus enabling faster acquisition, less sensitivity to spurious emissions, and greater robustness to multipath and vehicle dynamics. The motion characterization system 6 optionally determines acceleration aiding estimates using range-rate prediction to each carrier track loop along with adjustments to code and carrier track loop bandwidths and PRN code dither values. Acceleration aiding requires both measurement of the vehicle acceleration vector as well as knowledge of the geodetic orientation of the vehicle. The motion characterization system 6 may use parameterized tracking loops configured to mediate multipath.

The measurement processing 28 in the GPS satellite selection control compares the GPS signals for GPS satellites tracked at both antennas. For non-multipath conditions, carrier/code loop processing for each channel should be identical. For identical antennas and antenna-to-receiver signal paths, the only source of difference comes from on-platform multipath. Fortunately, redundant GPS satellites are likely to exist for both navigation and interferometry purposes. A land navigation system can perform well with only three GPS satellites in view and the integration with the IMU allows the three GPS satellites to be used sequentially rather than simultaneously.

Broadband satellite data links use Ka band frequencies to achieve GHz-wide data bandwidth. At these higher frequencies, radio frequency (RF) energy is more highly focused for a given antenna size, and antenna gain can be made very high along a preferred direction. The high directionality of Ka band transmission provides a natural immunity to interference and signal leakage and the high-gain antennas can be manufactured in compact sizes. However, Ka band communication suffers from higher atmospheric attenuation, and the narrow beamwidth 33 in FIG. 9 of the communicating antennas demands more attention to pointing the beam at the communication source.

Selecting an approach to pointing a receiving antenna at a broadband satellite source depends on the dynamics of the relative geometry. Considering the satellite source, the pointing solution depends on whether the antenna is pointed at an earth-fixed source, as in the case of a Geosynchronous Earth Orbit (GEO) Satellite, or at a source moving relative to the earth, as in the case of a Low Earth Orbit (LEO) satellite. Considering the receiver antenna, the pointing solution also depends on whether the antenna is mounted on a rigid platform, such as the top of a building, or on a dynamically moving platform, such as the top of an automobile or an aircraft. There are also intermediate circumstances where the platform may be slightly moving, such as on a tower, or occasionally transported, as in an emergency situation.

For even the least stressful pointing scenario, a building top with GEO satellite, the very narrow antenna beam must be precisely pointed. Manual setup requires both precision mechanical alignment and realignment in the event the equipment is jarred, buffeted by winds, or moved by vibrations. By achieving in a low cost solution the error budget specified for the most stressful pointing applications, which is the moving vehicle with a LEO satellite network, the present invention permits a low cost solution having application to all broadband pointing situations.

Figure 9:
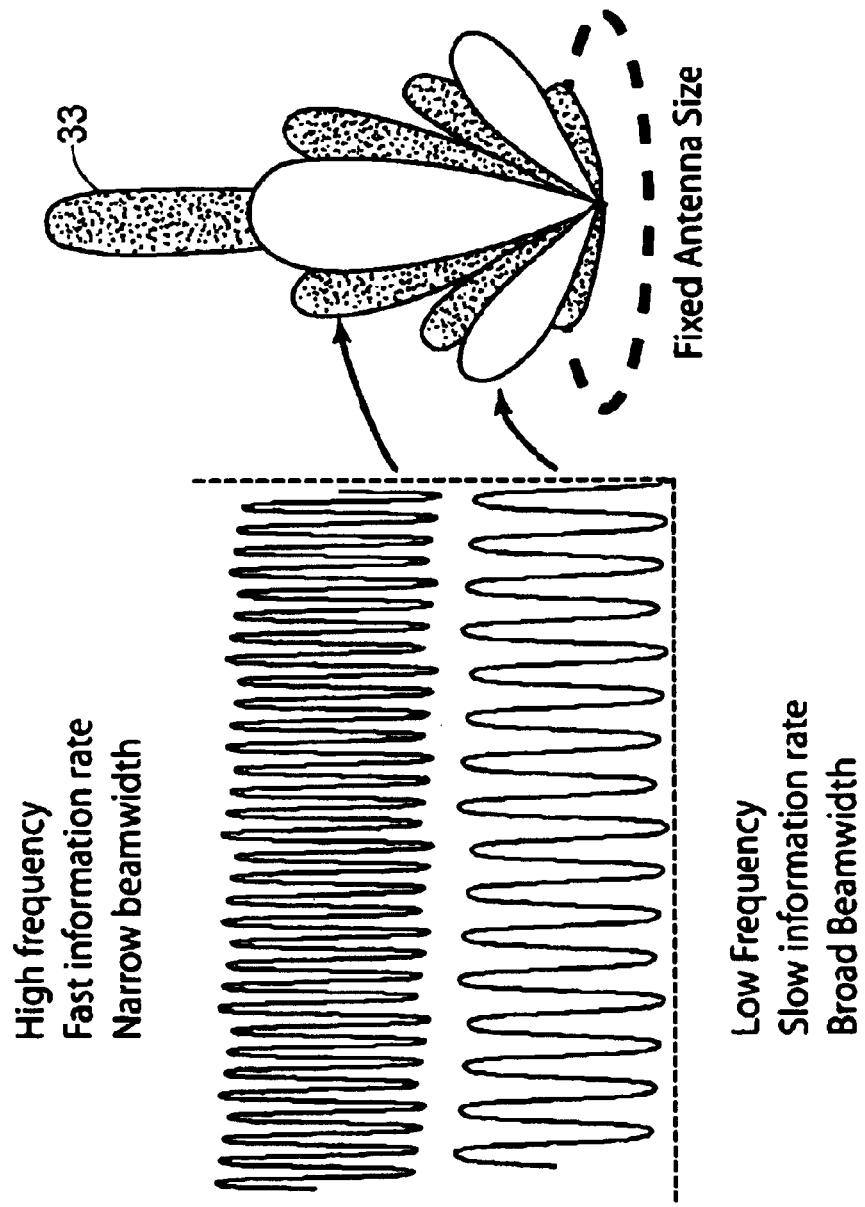
FIG. 9 is an antenna beam diagram showing the characteristics of broadband communication at high frequencies that pose fundamental requirements on attitude measurement accuracy.

For communication from a moving vehicle as in FIG. 1, the pointing system deflects the antenna with respect to the vehicle to maintain the proper pointing direction to the content-delivery satellite. Deflecting the beam can be accomplished using electrical techniques, mechanical techniques, or a combination of electrical and mechanical techniques. For an antenna having a fixed size as shown in FIG. 9, the present invention provides a pointing technique that keeps the antenna mainbeam 33 pointed at a content-delivery satellite.

A detailed simulation of the invention models the GPS satellite constellation, vehicle motion, INS hardware, GPS receiver, and the processing performed by the motion characterization system 6 to demonstrate the value of augmenting transfer alignment with GPS interferometry. Table 3 includes simulation parameters and corresponding nominal values. Results from the simulations, which are not shown, using the simulation parameters of Table 3 illustrate the operation of transfer alignment without interferometry on a slow-moving ground vehicle, showing the sensitivity to vehicle motion and the reliance on high-quality gyroscope measurements. By adding one GPS antenna to support interferometric measurements, the results of the simulation show the elimination of the drawbacks of transfer alignment.

TABLE 3

| Simulation Parameter | Nominal Value |
| --- | --- |
| antenna baseline distance | 12 in |
| baseline alignment sigma | 1 mrad |
| interferometric phase bias sigma | 2 mm |
| interferometric phase sigma | 1 mm |
| gyroscope bias sigma | 500 deg/hr |
| gyroscope scale factor error sigma | 20000 PPM |
| gyroscope noise | 2.56 deg/root-hr |
| accelerometer bias sigma | 10 mG |
| accelerometer scale factor error sigma | 20000 PPM |
| | 0.4 m/s/root- hr |
| accelerometer noise | 200 sec |
| gyroscope error correlation time | 200 sec |
| acceleration error correlation time | 10 mm |
| delta pseudorange error sigma | 0.1 m |
| pseudorange error sigma | 8 m |
| GPS clock bias sigma | 0.1 m/sec |
| GPS clock oscillator bias sigma | 10 m |
| IMU lever arm to master GPS | 0 m |
| Speed | 5 mph |

All the problems associated with transfer alignment stem from the inability to sense yaw attitude directly. Transfer alignment requires changes in vehicle velocity to enable estimation of yaw from velocity matching and requires precision gyroscopes because of the algorithmic need for heavy smoothing of the platform motion. The motion characterization system 6 overcomes this dilemma by sensing the yaw attitude from a completely different source—dual-antenna interferometry. As discussed above the approach for sensing yaw attitude requires only two antennas because transfer alignment provides precision estimates of roll and pitch. In addition, the solution for sensing yaw attitude provided by the present invention is relatively insensitive to GPS antenna spacing because of the smoothing benefits of even low-accuracy inertial components. The tight coupling of the interferometry solution with the IMU makes sensing yaw attitude in a low cost solution possible.

The vehicle trajectory used for the simulation has a changing vehicle velocity profile that transfer alignment requires for good performance. By using a changing velocity profile, the simulation provides a comparatively conservative view of the benefit of the invention. The simulation uses values for the nominal IMU parameters that are representative of automotive-grade MEMS accelerometers and gyroscopes. The MEMS gyroscope is 500-times poorer in bias and over 100 times poorer in noise figure than the typical tactical gyroscope. The MEMS accelerometer is only slightly poorer than the current tactical accelerometer. The GPS measurement quality is typical of commercial quality, low-cost units, and the error characteristics for the GPS interferometry configuration reflects practical installation constraints. The simulation uses a 1 mph nominal platform velocity to illustrate the performance of the motion characterization system 6 with only slight platform motion.

Figure 10:
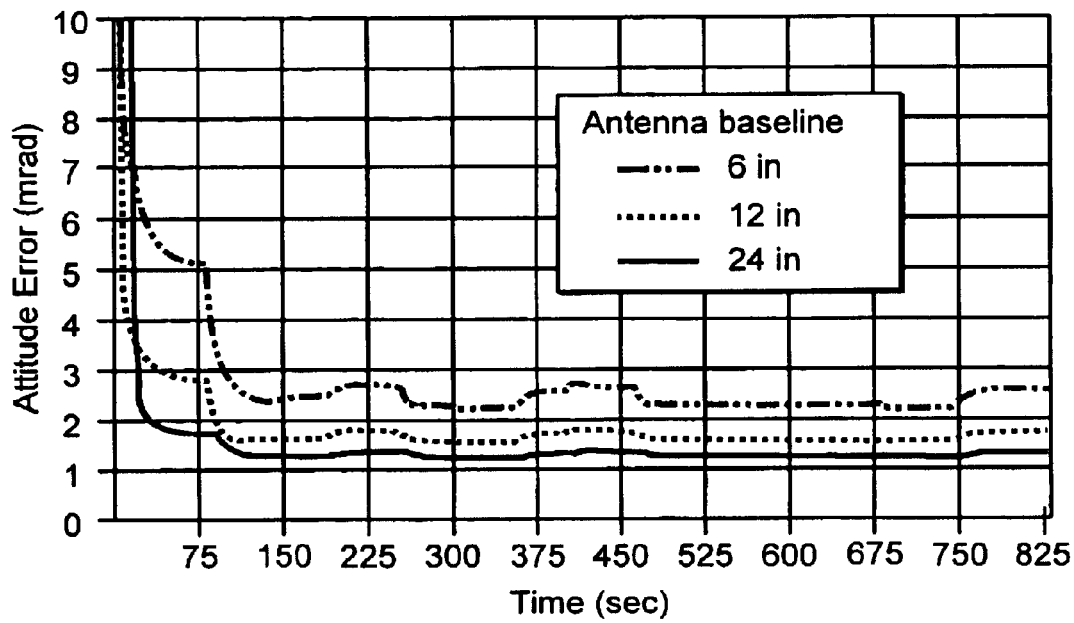
FIG. 10 is a plot produced by a system simulation for the motion characterization system modeled in the block diagram of FIG. 5, where attitude measurement error is parameterized by antenna baseline length.

The simulation results shown in FIG. 10 indicate that small interferometry baselines provide good yaw estimation accuracy. For example, a 12-in GPS antenna separation together with a nominal 1-mm phase error provides a yaw estimation accuracy of 1.7-mrad (0.1-deg). The 1-mm phase error over a 12-in antenna separation results in a single-look angular accuracy of 3-mrad. The use of multiple GPS satellites and the smoothing effects of the gyroscope measurements further improve accuracy.

Figure 11:
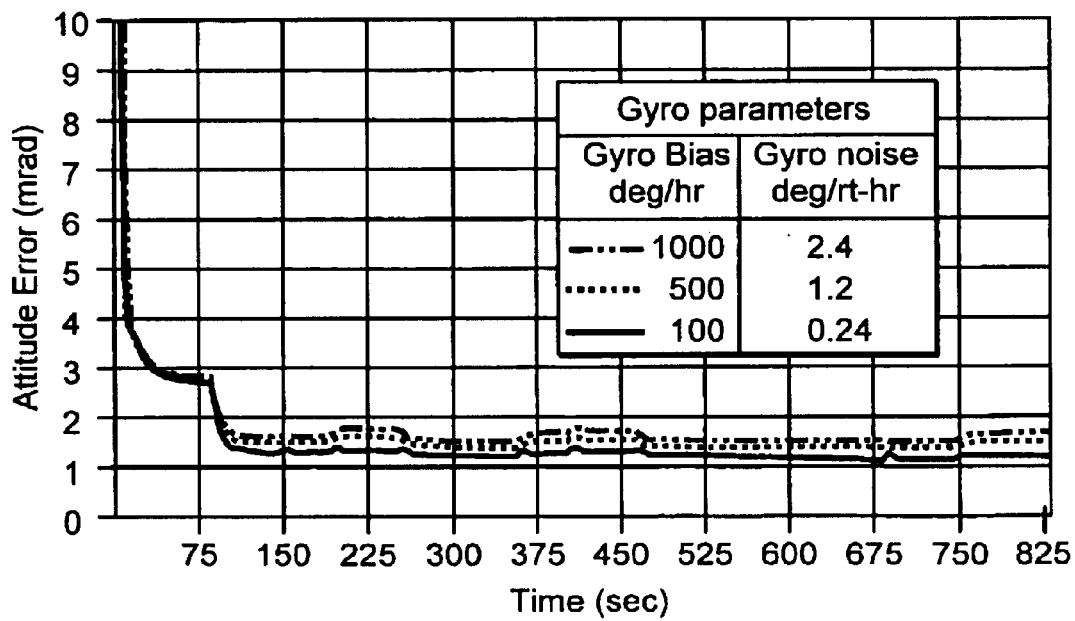
FIG. 11 is another plot produced by the system simulation for the motion characterization system modeled in the block diagram of FIG. 5, where attitude measurement error is parameterized by gyroscope error.

The simulation results shown in FIG. 11 indicate that accurate estimates of yaw are relatively insensitive to gyroscope accuracy over the modeled region. In addition, although not shown, the roll and pitch estimation accuracy remains excellent. The interferometry is the dominant factor in yaw angle observability and not the smoothing that results from rate measurement. Additional simulation results are shown and described in U.S. Provisional Application No. 60/272,170, filed on Feb. 28, 2001; the entire teachings of which are incorporated herein by reference.

Traditional GPS-alone interferometry solutions require an initialization step using sophisticated search procedures to overcome the three-dimensional wavelength ambiguity associated with the differential range measurement. Transfer alignment provides an initial yaw estimate with vehicle motion; otherwise, an eight-position search of the 0–360 deg yaw space will be required. The dual-antenna solution employed by the motion characterization system 6 mitigates initialization by requiring ambiguity resolution over only a single axis of yaw. The excellent pitch and roll estimate provided by the accelerometers provides improved performance over a conventional GPS-alone interferometry system. In addition, in one embodiment, a short 12-in baseline of the antennas 7 significantly reduces sensitivity to yaw uncertainty because the ambiguity is on the same order as the baseline length. Thus, only a very coarse estimate of yaw, about 45 deg, ensures an unambiguous attitude solution.

Figure 12:
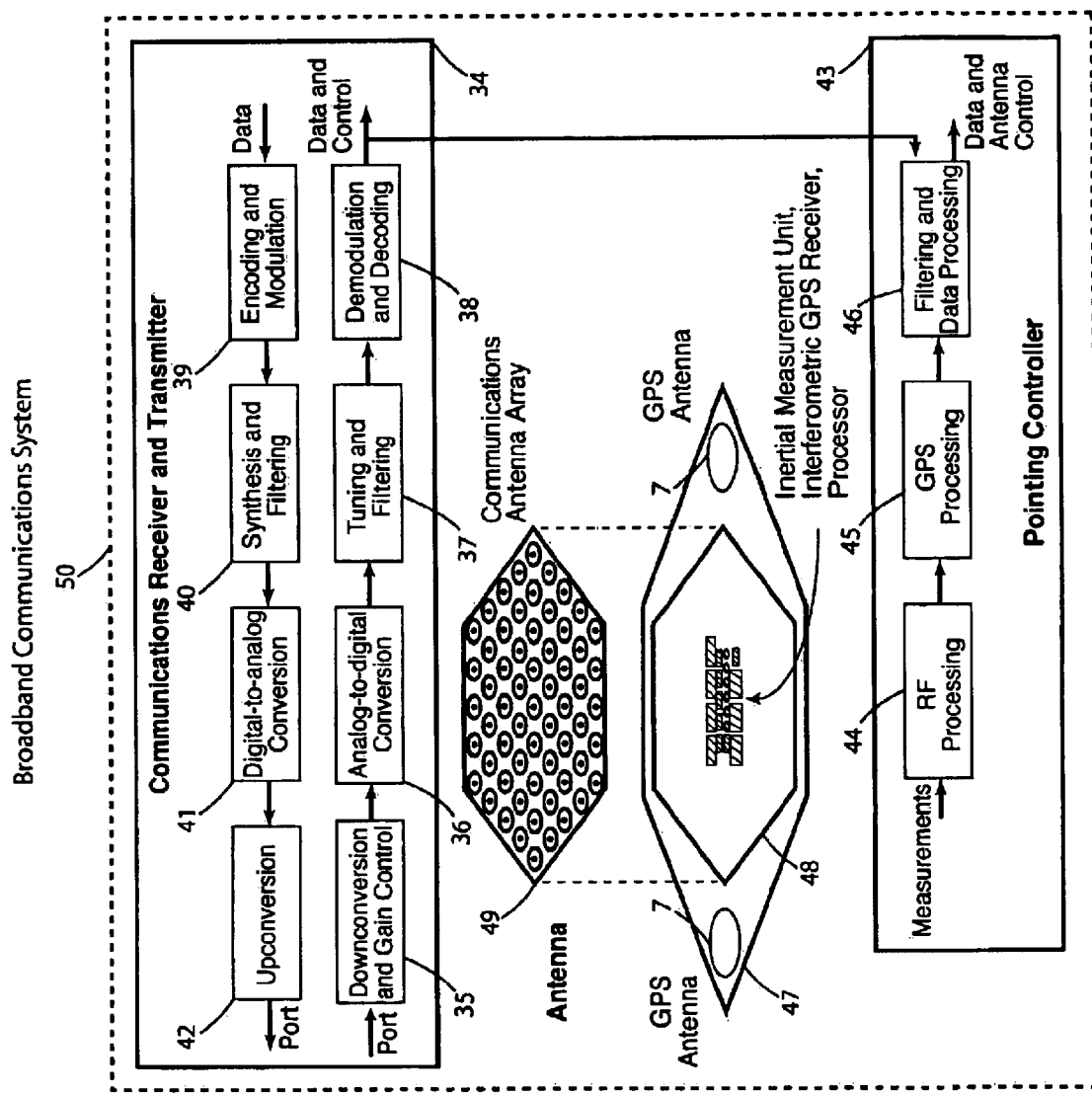
FIG. 12 is a block diagram that shows the integration of the motion characterization system into a broadband communication system.

FIG. 12 is a diagram of an example of a broadband communication system 50 with integrated pointing control according to the principles of the present invention. An example shown in FIG. 12 of the broadband communication system 50 integrates an broadband antenna system 47, a communications receiver and transmitter 34, a pointing controller 43, The broadband antenna system 47 consists of communications antenna array 49 and one embodiment of the motion measurement system 6 mounted on one or more substrates, which includes 2 GPS antennas, an Inertial Measurement Unit, an interferometric GPS receiver, and a processor.

The communications receiver and transmitter 34 may be constructed from a commodity chipset, applications specific chipsets, or discrete components. The broadband communications system 50 may include the communications functions typically found in a commercially available communications receiver and transmitter. For the receive chain, the functions include downconversion and gain control 35, analog-to-digital conversion 36, tuning and filtering 37, and demodulation and decoding 38. For the transmit chain, the functions include encoding and modulation 39, synthesis and filtering 40, digital-to-analog conversion 41, and upconversion 42.

The pointing controller 43 uses the capabilities of the present invention as described above and adds the processing necessary to effectively point the communications antenna array 49 at a transmitting source or receiving sink. The pointing controller 43 includes RF processing 44, GPS processing 45, and filtering and data processing 46. Many other integration methods of the example broadband communication system 50 are possible, as determined by cost and application.

While this invention has been particularly shown and described with references to preferred embodiments thereof, it will be understood by those skilled in the art that various changes in form and details may be made therein without departing from the scope of the invention encompassed by the appended claims.

What is claimed is:

1. A motion characterization system, comprising:
    two antennas, mounted to a rigid body, to receive navigation signals;
    a collection of motion sensing devices, including rate gyroscopes providing poorer than ten degrees per hour accuracy, mounted on the rigid body to provide electrical signals providing motion information; and
    a processor electrically coupled to process electrical signals from the antennas and the motion sensing devices to provide an attitude measurement of the rigid body under arbitrary motion conditions.

2. The measurement system as claimed in claim 1, wherein the antennas are separated by less than three wavelengths of a signal received from an external signaling source.

3. The measurement system as claimed in claim 2, wherein the external signaling source is a plurality of GPS satellites.

4. The measurement system as claimed in claim 3, wherein the antennas are separated by about 150 millimeters (mm).

5. The measurement system as claimed in claim 1, wherein the motion sensing devices include at least one MEMS device.

6. The measurement system as claimed in claim 5, wherein the processor processing the motion sensing devices provides an acceleration signal.

7. The measurement system as claimed in claim 1, wherein the arbitrary motion conditions include general moving motions, constant velocity motions, and stationary motions.

8. The measurement system as claimed in claim 1, wherein the attitude measurement is accurate to within about 1 degree.

9. The measurement system as claimed in claim 1, wherein one antenna is used supports navigation processing and the other antenna supports interferometry processing.

10. The measurement system as claimed in claim 1, wherein alignment error between the antenna baseline and the motion sensing devices is estimated by software.

11. The measurement system as claimed in claim 1, wherein the processor includes a twelve-channel GPS receiver.

12. The measurement system as claimed in claim 11, wherein after an initialization process, unused channels in the GPS receiver (i) receive data by one of the antennas supporting interferometry, and (ii) track GPS satellites most nearly orthogonal to the antenna baseline.

13. A method for determining attitude of a rigid body, comprising:
receiving navigation signals at the rigid body;
measuring motion of the rigid body, including rate with poorer than ten degrees per hour accuracy, and providing corresponding motion signals; and
processing the navigation signals and motion signals to provide an attitude measurement of the rigid body under arbitrary motion conditions.

14. The method as claimed in claim 13, wherein the navigation signals are GPS signals.

15. The method as claimed in claim 13, wherein the arbitrary motion conditions include general moving motions, constant velocity motions, and stationary motions.

16. A motion characterization system, comprising:
platform means;
means for receiving navigation signals at said platform means;
means for sensing motion of said platform means and for providing associated motion signals, including rate of said platform means with an accuracy of poorer than ten degrees per hour; and
means for processing the navigation signals and the motion signals to provide an attitude measurement of said platform means under arbitrary motion conditions.

17. A mobile system, comprising:
a platform;
a motion characterization system including:
(i) a first navigation antenna and second navigation antenna coupled to the platform to receive navigation carrier signals, (ii) a plurality of motion sensing devices coupled to the platform to provide motion signals representative of motion of the platform, and (iii) a processor (a) coupled to the antennas to make range and carrier phase measurements of the navigation carrier signals at a plurality of epochs defining the navigation carrier signals and to segment the range and carrier phase measurements for the navigation carrier signals into a navigation set and an interferometry set, the sets having at least one navigation carrier signal for a plurality of navigation epochs and supporting interferometry calculations and (b) coupled to the motion sensing devices to receive the motion signals and to convert the motion signals into measurements of platform motion for a plurality of epochs defined for the motion signals, the processor determining a navigation solution including position and attitude of the platform from the range and carrier phase measurements for the navigation carrier signals and from measurements of platform motion developed from the motion signals; and
a subsystem in communication with the motion characterization system responsive to the navigation solution.

18. The mobile system as claimed in claim 17, wherein the motion sensing devices include rate gyroscopes providing poorer than ten degrees per hour accuracy.

19. The mobile system as claimed in claim 17, wherein the first and second navigation antennas are separated by less than three wavelengths of the navigation carrier signal.

20. The mobile system as claimed in claim 17, wherein the navigation carrier signals are provided by a plurality of GPS satellites.

21. The mobile system as claimed in claim 17, wherein the motion sensing devices include at least one MEMS device.

22. The mobile system as claimed in claim 17, wherein the platform motion includes general moving motions, constant velocity motions, and stationary motions.

23. The mobile system as claimed in claim 17, wherein the attitude measurements are accurate to within about 1 degree.

24. The mobile system as claimed in claim 17, wherein the first navigation antenna supports navigation processing and the other antenna supports interferometry processing.

25. The mobile system as claimed in claim 17, wherein software executed by the processor corrects for alignment error between a baseline defined by the first and second navigation antennas and a coordinate system defined by the motion sensing devices.

26. The mobile system as claimed in claim 17, wherein the processor includes a twelve-channel GPS receiver.

27. The mobile system as claimed in claim 26, wherein, after an initialization process, unused channels in the GPS receiver (i) receive data from the second navigation antenna, acting as an interferometry antenna, and (ii) track GPS satellites most nearly orthogonal to a baseline defined by the first and second navigation antennas.

28. The mobile system as claimed in claim 17, wherein the processor allocates, in an optimized manner, a plurality of navigation signals to the navigation set or the interferometry set using navigation and interferometry performance estimates.

29. The mobile system as claimed in claim 17, wherein the processor improves the accuracy of the range, carrier phase, and interferometry processing for the navigation carrier signals by providing estimates of acceleration along a line-of-sight from the platform to each of a plurality of navigation signal sources.

30. The mobile system as claimed in claim 17, wherein the processor synchronizes the measurements of platform motion, provided by the motion sensing devices, using time estimates developed from the navigation carrier signals.

31. The mobile system as claimed in claim 17, wherein the subsystem includes a directive antenna directing an associated antenna beam via mechanical means.

32. The mobile system as claimed in claim 17, wherein the subsystem includes a directive antenna directing an associated antenna beam via electronic means.

33. The mobile system as claimed in claim 17, wherein the subsystem includes a directive antenna mechanically coupled to the platform and electrically coupled to the motion characterization system to direct an associated antenna beam in response to the navigation solution.

34. The mobile system as claimed in claim 17, wherein the subsystem includes a vehicle safety system.

35. A method for determining attitude of a stationary or moving platform, comprising:
receiving navigation carrier signals;
making range and carrier phase measurements of the navigation carrier signals at a plurality of navigation system epochs defining the navigation carrier signals;
segmenting the range and carrier phase measurements for the navigation carrier signals into a navigation set and an interferometry set, the sets (i) having at least one navigation carrier signal for a plurality of the navigation system epochs and (ii) supporting interferometry calculations;

receiving motion signals representing motion of the platform;

converting the motion signals into measurements of platform motion for a plurality of epochs defined for the motion signals; and determining a navigation solution including position and attitude of the platform from the range and carrier phase measurements for the navigation carrier signals and from the measurements of platform motion developed from the motion signals.

36. The method according to claim 35, further including allocating, in an optimizing manner, a plurality of navigation carrier signals to the navigation set or the interferometry set using navigation and interferometry performance estimates.

37. The method according to claim 35, further including improving the accuracy of the range, carrier phase, and interferometry processing for the navigation carrier signals by providing estimates of the acceleration along the line-of-sight from the platform to each of a plurality of navigation system signal sources.

38. The method according to claim 35, further including synchronizing the measurements of vehicle motion, provided by the motion sensing devices, using the time estimates developed from the navigation carrier signals.

39. The method according to claim 35, wherein the navigation carrier signals are received by two navigation system antennas that are mounted to the platform and the motion signals are provided by motion sensing devices also mounted to the platform.

40. The method according to claim 35, wherein the navigation set is associated with one of the two navigation system antennas and the interferometry set is associated with the other of the two navigation system antennas.

41. The method according to claim 35, to further include providing the navigation solution for use by a subsystem associated with the platform.

42. The method according to claim 35, wherein the subsystem is a safety system, stability control system, pointing system, geodetic position control system, attitude control system, or mapping projection system.

43. The method according to claim 35, wherein the navigation carrier signals are provided by a plurality of GPS satellites.

44. An apparatus for determining attitude of a platform under arbitrary motion conditions, comprising:

means for receiving navigation carrier signals;

means for making range and carrier phase measurements of the navigation carrier signals at a plurality of epochs defining the navigation carrier signals;

means for segmenting the range and carrier phase measurements for the navigation carrier signals into a navigation set and an interferometry set, the sets (i) having at least one navigation carrier signal for a plurality of navigation system epochs and (ii) supporting interferometry calculations;

means for converting the motion signals into measurement of platform motion for a plurality of navigation system epochs defined for the motion signals; and means for determining a navigation solution including position and attitude of the platform from the range and carrier phase measurements of platform motion developed from the motion signals.

* * * * *